United States Patent [19]

Shinozaki

[11] Patent Number: 5,350,187
[45] Date of Patent: Sep. 27, 1994

[54] ADJUSTABLE DAMPING SYSTEM

[75] Inventor: David M. Shinozaki, Piedmont, S.C.

[73] Assignee: Monroe Auto Equipment Company, Monroe, Mich.

[21] Appl. No.: 962,501

[22] Filed: Oct. 16, 1992

[51] Int. Cl.$^5$ .......................................... B60G 11/26
[52] U.S. Cl. ................................... 280/707; 188/299
[58] Field of Search ................ 280/707, 714; 188/299

[56] References Cited

U.S. PATENT DOCUMENTS

| | | | |
|---|---|---|---|
| 725,456 | 4/1903 | Lemp | 188/299 |
| 2,717,058 | 9/1955 | Brundrett | 188/88 |
| 3,039,566 | 6/1962 | Rumsey | 188/88 |
| 3,124,368 | 3/1964 | Corley et al. | 280/6 |
| 3,771,626 | 11/1973 | Palmer | 188/282 |
| 3,882,977 | 5/1975 | Watanabe | 188/322 |
| 4,065,154 | 12/1977 | Glaze | 280/707 |
| 4,113,072 | 9/1978 | Palmer | 188/282 |
| 4,325,468 | 4/1982 | Siorek | 188/282 |
| 4,333,668 | 6/1982 | Hendrickson et al. | 280/703 |
| 4,468,050 | 8/1984 | Woods et al. | 280/707 |
| 4,469,315 | 9/1984 | Nicholls et al. | 267/64.17 |
| 4,474,271 | 10/1984 | Molders et al. | 188/280 |
| 4,505,988 | 3/1985 | Urano et al. | 428/569 |
| 4,527,676 | 7/1985 | Emura et al. | 188/299 |
| 4,598,929 | 7/1986 | Kumagai et al. | 280/707 |
| 4,600,215 | 7/1986 | Kuroki et al. | 280/707 |
| 4,620,619 | 11/1986 | Emura et al. | 188/319 |
| 4,635,960 | 1/1987 | Shirakuma | 280/707 |
| 4,638,896 | 1/1987 | Poyser | 188/299 |
| 4,645,044 | 2/1987 | Kato et al. | 188/319 |
| 4,648,622 | 3/1987 | Wada et al. | 280/707 |
| 4,660,686 | 4/1987 | Munning et al. | 188/280 |
| 4,671,392 | 6/1987 | Wossner | 188/299 |
| 4,673,067 | 6/1987 | Munning et al. | 188/299 |
| 4,696,379 | 9/1987 | Yamamoto et al. | 188/299 |
| 4,696,489 | 9/1987 | Fujishiro et al. | 280/707 |
| 4,697,237 | 9/1987 | Tanaka et al. | 364/424 |
| 4,700,303 | 10/1987 | Tokuyama et al. | 364/424 |
| 4,722,548 | 2/1988 | Hamilton et al. | 280/707 |
| 4,726,453 | 2/1988 | Obstfelder et al. | 188/319 |
| 4,732,408 | 3/1988 | Ohlin | 280/707 |
| 4,741,554 | 5/1988 | Okamoto | 280/703 |
| 4,743,046 | 5/1988 | Schnittger | 280/707 |
| 4,754,855 | 7/1988 | Kuwana et al. | 188/299 |
| 4,867,475 | 9/1989 | Groves | 280/707 |
| 4,890,858 | 1/1990 | Blankenship | 280/707 |
| 4,901,828 | 2/1990 | Schmidt et al. | 188/288 |
| 4,923,038 | 5/1990 | Lizell | 188/299 |
| 4,926,983 | 5/1990 | Taubitz et al. | 188/299 |
| 4,943,083 | 7/1990 | Groves et al. | 280/707 |
| 5,016,908 | 5/1991 | Athanas et al. | 280/707 |
| 5,020,825 | 6/1991 | Lizell | 280/707 |
| 5,025,899 | 6/1991 | Lizell | 188/299 |
| 5,090,524 | 2/1992 | Miller et al. | 188/299 |
| 5,092,626 | 3/1992 | Athanas et al. | 280/707 |
| 5,123,671 | 6/1992 | Driessen et al. | 280/707 |
| 5,143,186 | 9/1992 | Lizell | 188/299 |

FOREIGN PATENT DOCUMENTS

| | | | |
|---|---|---|---|
| 0115202 | 8/1984 | European Pat. Off. | |
| 166313A | 2/1986 | European Pat. Off. | 280/707 |
| 1505417 | 3/1970 | Fed. Rep. of Germany | |
| 3405315 | 8/1985 | Fed. Rep. of Germany | 188/299 |
| 1130621 | 2/1957 | France | |
| 7173632 | 10/1982 | Japan | 188/322.15 |
| 61-13041 | 1/1986 | Japan | 188/299 |
| WO8707565 | 12/1987 | PCT Int'l Appl. | |
| WO8806983 | 9/1988 | PCT Int'l Appl. | |
| WO9216388 | 10/1992 | PCT Int'l Appl. | |
| 1308509 | 7/1987 | U.S.S.R. | 280/707 |

Primary Examiner—Kenneth R. Rice
Assistant Examiner—Paul Dickson
Attorney, Agent, or Firm—Harness, Dickey & Pierce

[57] ABSTRACT

An adjustable damping system (10) for motor vehicles is disclosed. The adjustable damping system (10) includes dampers (10) for damping road vibration. Each of the dampers (10) include a pressure cylinder (48) which forms a working chamber (50) which are operable to store damping fluid. In addition, the dampers (10) have a device (176) for electrically controlling the flow of damping fluid between each of the portions in the pressure cylinder (48). The adjustable damping system further includes a plurality of separate electronic control modules (34) which are operable to control the damping characteristics of the dampers (10). Finally, the adjustable damping system (10) includes a switch (32) for generating a plurality of electrical control signals.

32 Claims, 12 Drawing Sheets

ADJUSTABLE DAMPING SYSTEM

BACKGROUND OF THE INVENTION

1. Field of the Invention

This invention relates to suspension systems for automotive vehicles and machines which receive mechanical shock, and more particularly to an adjustable damping system.

2. Description of Related Art

Dampers are used in connection with automotive suspension systems to absorb unwanted vibrations which occur during driving. To dampen unwanted vibrations, dampers are generally connected between the body and the suspension of the automotive vehicle. A piston assembly is located within the damper and is connected to the body of the automotive vehicle through a piston rod. Because the piston assembly is able to limit the flow of damping fluid within the working chamber of the damper when the damper is compressed or extended, the damper is able to provide a damping force which "smooths" or "dampens" vibrations transmitted from the suspension to the body.

The greater the degree to which the flow damping fluid within the working chamber is restricted by the piston assembly, the greater the damping forces which are provided by the damper. Accordingly, a "soft" compression and rebound stroke is produced when the flow of damping fluid in the working chamber is relatively unrestricted. In contrast, a "firm" compression and rebound stroke is produced when there is an increased restriction in the flow of damping fluid in the working chamber.

Because different driving characteristics depend on the amount of damping forces the damper provides, it is often desirable to have a damper in which the amount of damping forces generated by the damper is adjustable. One method for selectively changing the damping characteristics of a damper is disclosed in U.S. Pat. No. 4,890,858. This reference discloses a damping system in which a switch is used to control the damping characteristics of a suspension system. In the regard, the switch is used to control the position of a rotary valve inside each of the dampers in the suspension system. The rotary valve is in turn used to control the flow of damping fluid between the upper and lower portions of the working chamber so as to change damping characteristics.

SUMMARY OF THE INVENTION

Accordingly, it is the primary object of the present invention to provide an adjustable damping system in which the degree of damping provided by the suspension system may be controlled with a relatively high degree of accuracy. A related object of the present invention is to provide an adjustable damping system in which the amount of damping force provided can be adjusted relatively quickly.

Another object of the present invention is to provide an adjustable damping system in which the control modules for controlling the dampers associated with the adjustable damping system may be used with a variety of motor vehicles.

Another object of the present invention is to provide an adjustable damping system for aftermarket supply. In this regard, a related object of the invention is to provide an adjustable damping system which is easily expanded to include multi-axial vehicles using relatively uniform components.

A further object of the present invention is to provide an adjustable damping system which is able to accommodate a variety of automotive vehicles in this regard, a related object of the present invention is to provide an adjustable damping system which can be easily modified for different vehicle installations.

Another object of the invention is to provide a relatively simple manually adjustable damping system. In this regard, a related object of the present invention is to provide components which are of relatively simple construction.

A further object of the present invention is to provide an adjustable damping system which is relatively low in cost and relatively easy to install.

BRIEF DESCRIPTION OF THE DRAWINGS

Other objects of the present invention will become apparent to one skilled in the art upon reading following specification and by reference to the following drawings in which:

FIG. 16 is a top view of the cover plate for the switch shown in FIGS. 1–3 as viewed by the driver of the automotive vehicle.

DESCRIPTION OF THE PREFERRED EMBODIMENT

Figure 1:
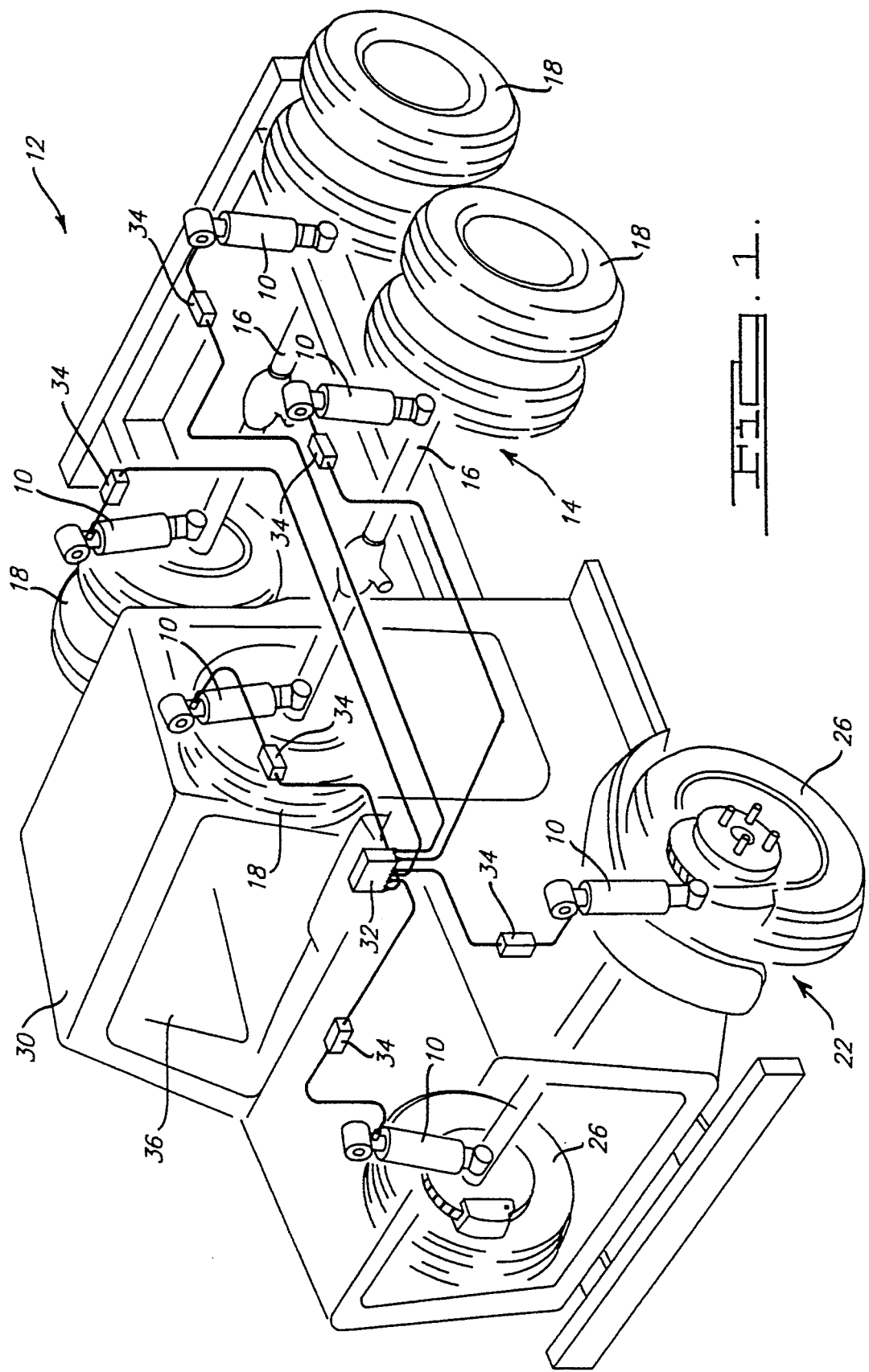
FIGS. 1–3 are illustrations of various automotive vehicles using the adjustable damping system according to the teachings of the preferred embodiment of the present invention.

Referring to FIG. 1, a plurality of six dampers 10 according to the preferred embodiment of the present invention are shown. The dampers 10 are depicted in operative association with a diagrammatic representation of a conventional automotive vehicle 12. The automotive vehicle 12 includes a rear suspension system 14 having two transversely extending drive axle assemblies 16 adapted to operatively support the vehicle's rear wheels 18. The drive axle assemblies 16 are operatively connected to the automotive vehicle 12 by means of a plurality of dampers 10 as well as by leaf or air springs (not shown). Similarly, the automotive vehicle 12 has a front suspension system 22 including a transversely extending front steel axle assembly (not shown) to operatively support the front wheels 26. Front steer axle assembly is operatively connected to the automotive vehicle 12 by means of a pair of dampers 10 and by leaf or air springs (not shown). The dampers 10 serve to damp the relative movement of the unsprung portion (i.e., the front and rear suspension systems 22 and 14) and the sprung portion (i.e., the body 30) of the automotive vehicle 12.

Figure 2:
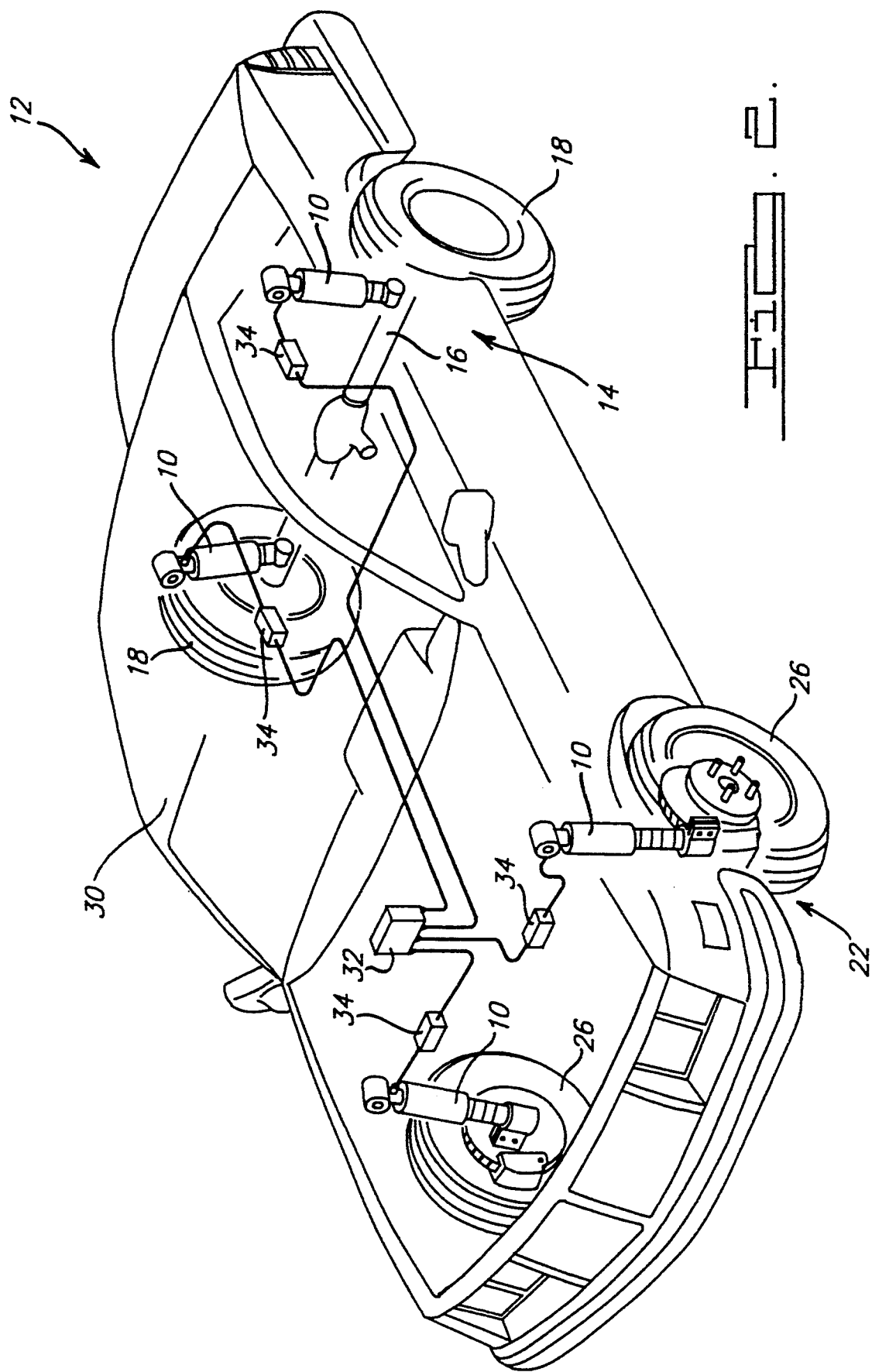
Figure 3:
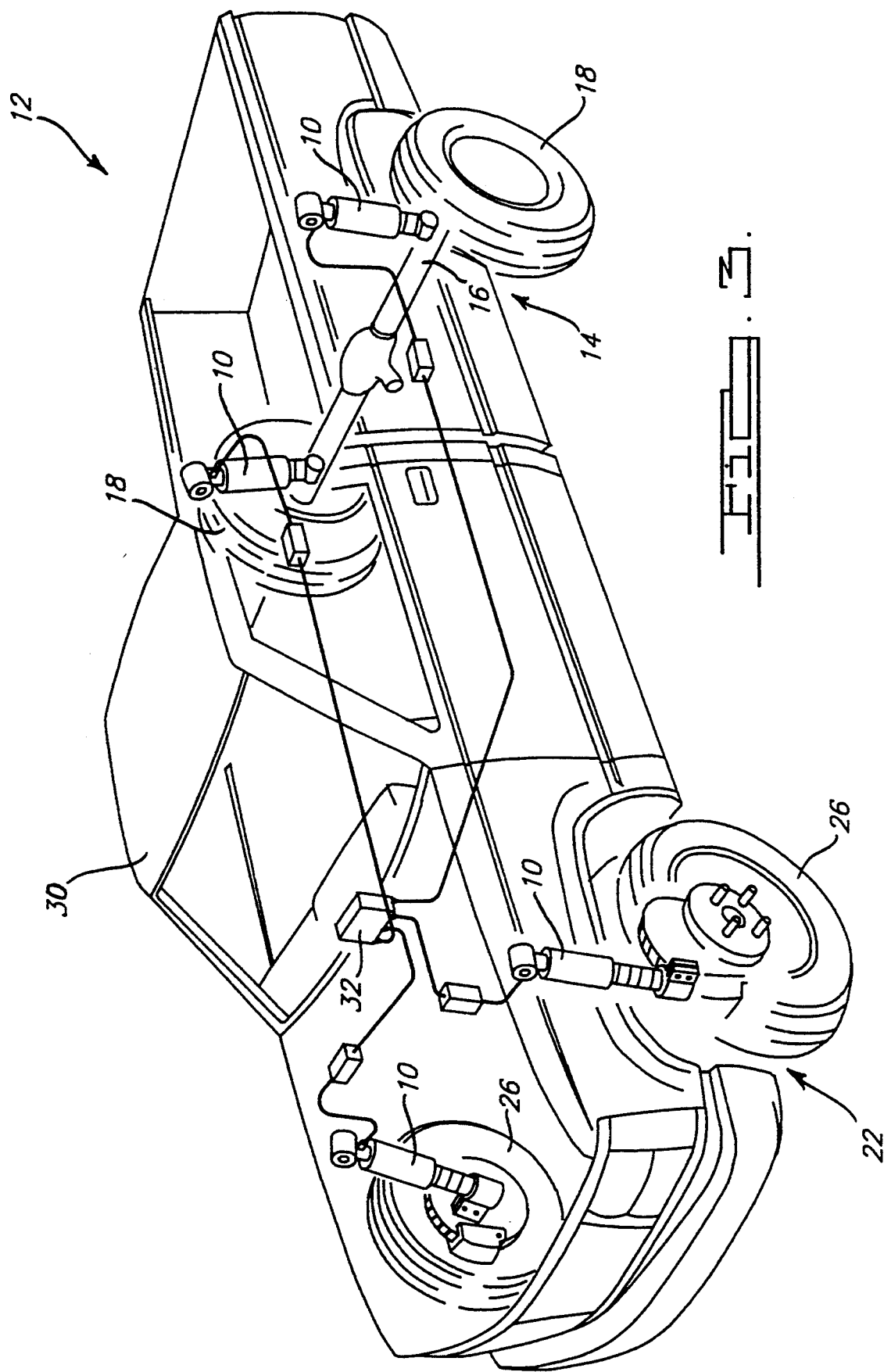

While the automotive vehicle 12 has been depicted as a multi-axle truck, the damper 10 may be used with other types of automotive vehicles with other types of suspension systems. For example, FIG. 2 shows a passenger car application, and FIG. 3 shows a light pick-up truck application. Further, the term "damper" as used herein will refer to dampers in the general sense of the phrase and will include MacPherson struts and shock absorbers.

To allow the damping characteristics of the dampers 10 to be controlled, a switch module 32 and a plurality of electronic control modules 34 are provided. The switch module 32 is located within the passenger compartment 36 of the automotive vehicle 12 and is accessible by the driver of the automotive vehicle 12. The switch module 32 is used for selecting which type of damping characteristics the dampers 10 are to provide (i.e., firm, soft, or normal). The electronic control modules 34 receive the electronic control signals from the switch module 32 and are used for controlling damping characteristics of the dampers 10. By controlling the damping characteristics of the dampers 10, the dampers 10 are able to dampen relative movement between the body 30 and the suspension of the automotive vehicle 12 in such a manner as to optimize both ride comfort and road handling ability simultaneously.

Figure 4:
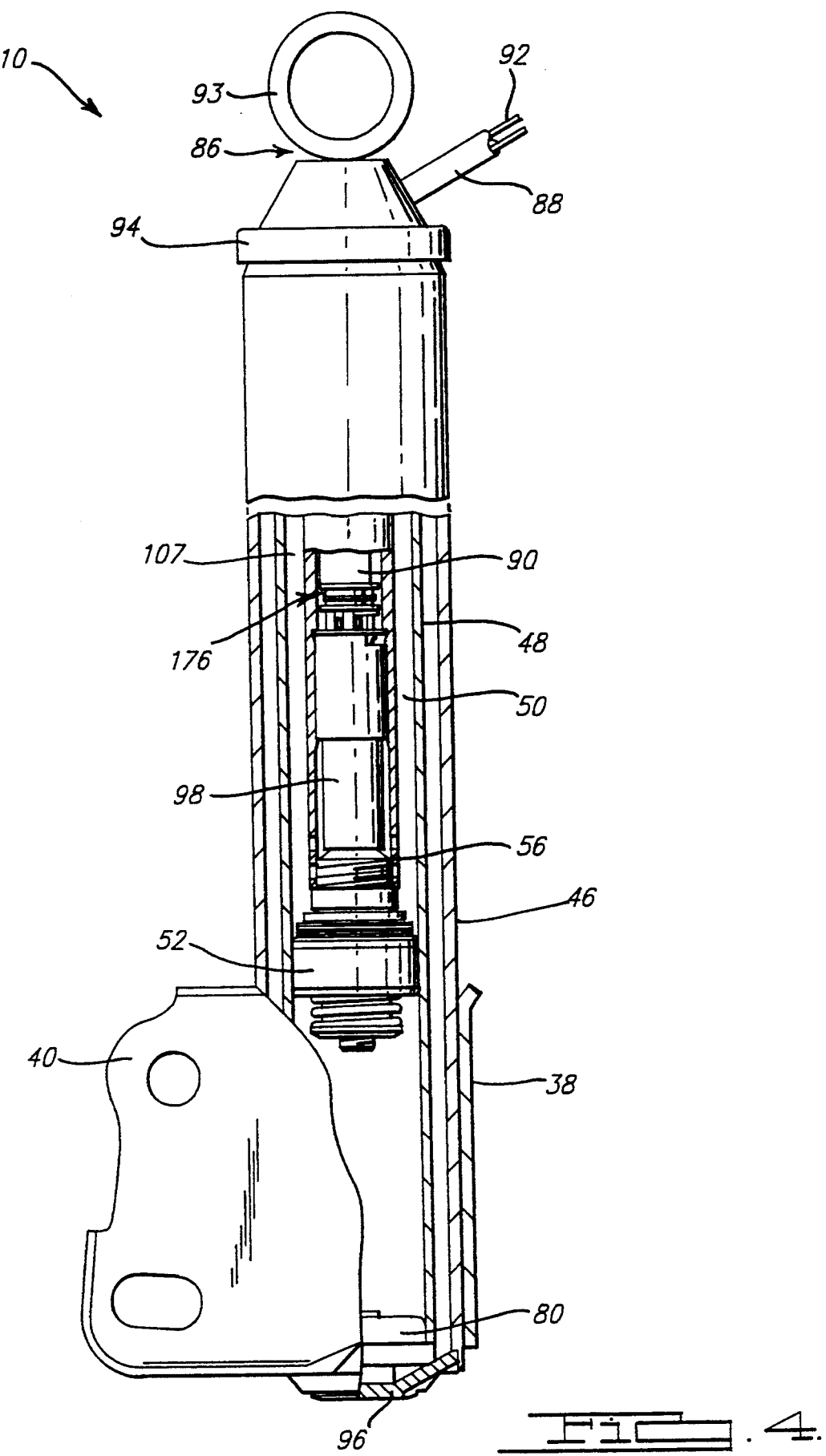
FIG. 4 is the schematic representation of the damper using the adjustable damping system according to the teachings of the preferred embodiment of the present invention.
Figure 5:
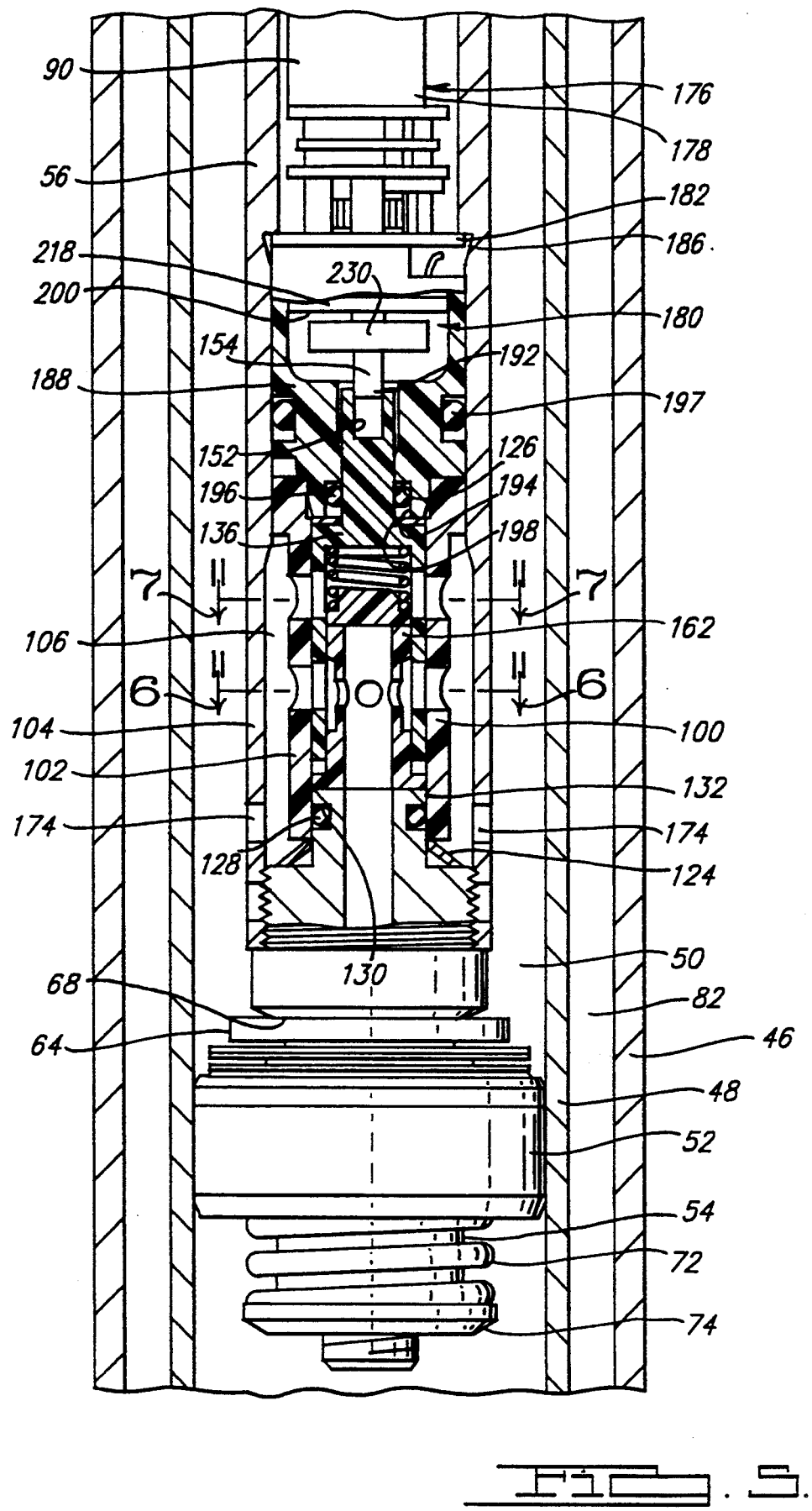
FIG. 5 is a side elevational view, partially broken away, of the lower portion of the damper shown in FIG. 4.
Figures 6, 7:
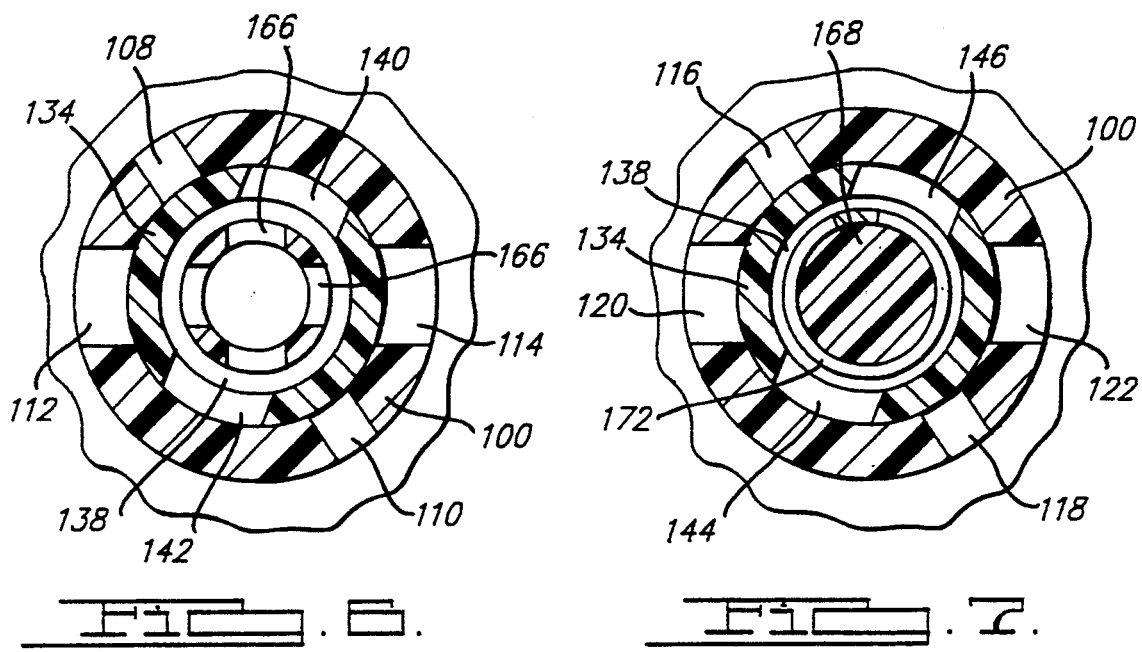
FIG. 6 is a view taken in the direction of line 6—6 in FIG. 5.
FIG. 7 is a view taken in the direction of line 7—7 in FIG. 5.
Figure 8:
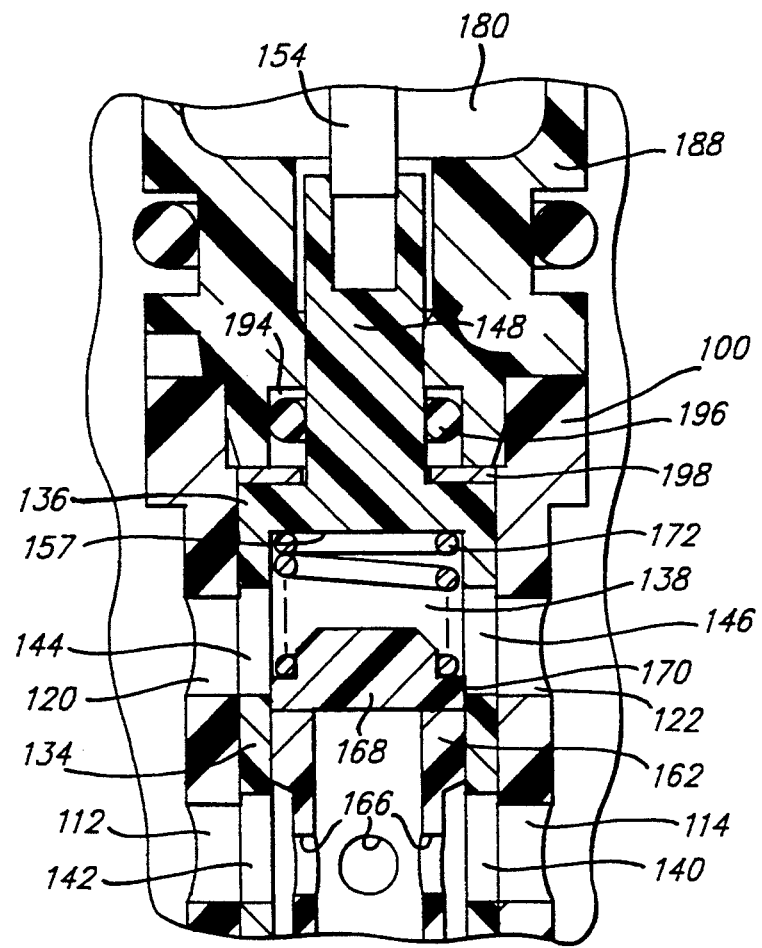
FIG. 8 is a view of the upper portion of the rotary valve shown in FIG. 5.

To support the damper 10, the damper 10 further comprises a generally sleeve-shaped wheel spindle section 38 as shown in FIGS. 4 and 5. The wheel spindle section 38 extends around the periphery of the damper 10 and is fixedly secured thereto by welding. The wheel spindle section 38 includes a radial outwardly extending portion 40 which is adapted to be connected by suitable screws, bolts or other threaded fastening means to a suitable flange (not shown) on the wheel spindle. It should be appreciated that the wheel spindle section 38 may be replaced by another support member depending on the particular use of the damper 10. For example, the wheel spindle section 38 may be replaced with a base cup loop when the damper 10 is used in a heavy truck application.

Figure 9:
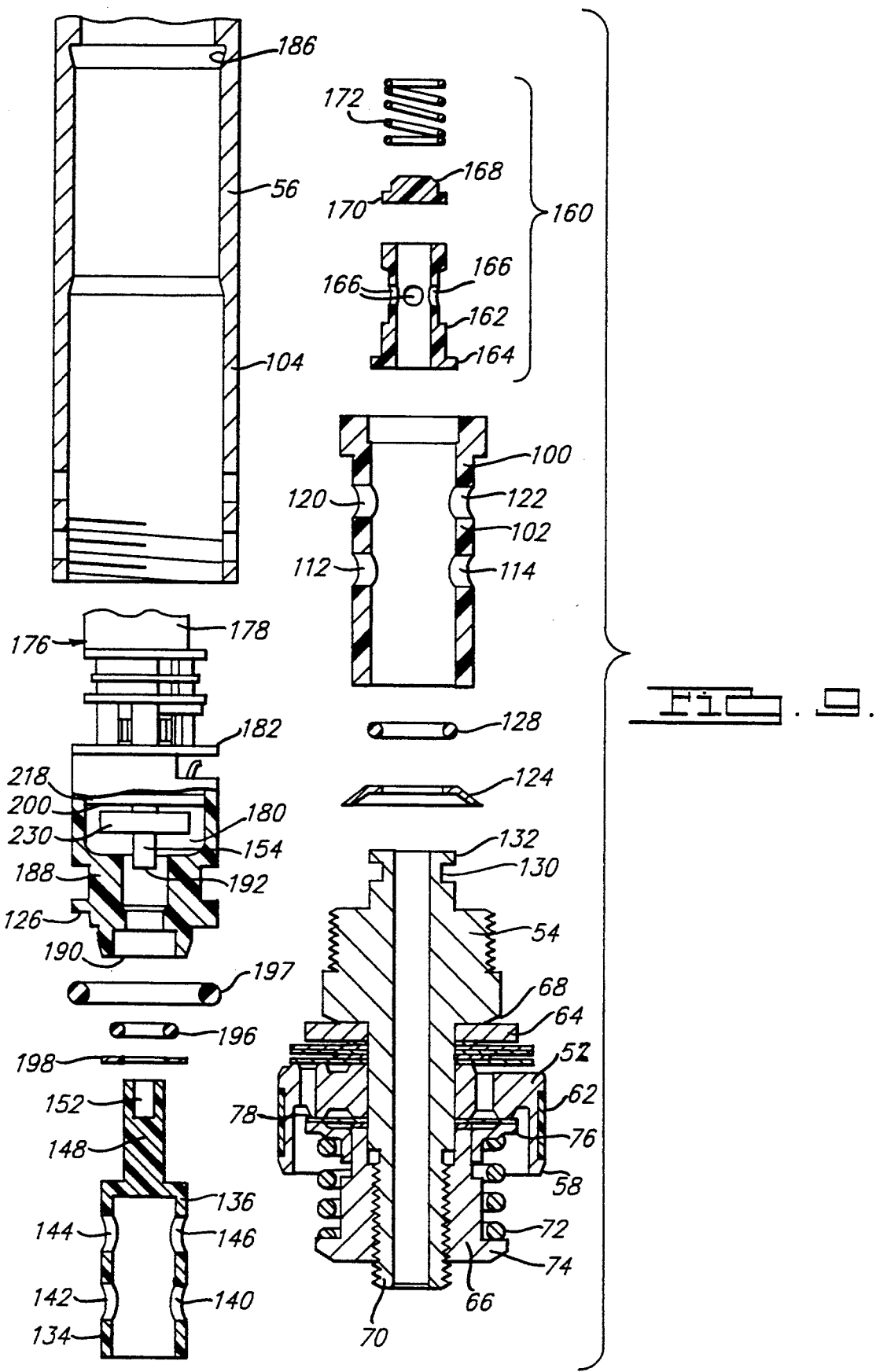
FIG. 9 is an elevated perspective exploded view of the lower portion of the piston rod shown in FIG, 5 showing the actuator, rotary valve and piston.

The damper 10 comprises an elongated tubular pressure cylinder 48 defining a damping fluid-containing working chamber 50. Disposed within the chamber 50 is a reciprocal piston 52. As shown in FIG. 9, the reciprocal piston 52 is secured to one end of an axially extending piston post 54 which is in turn secured to an axially extending piston rod 56. The piston 52 comprises a housing 58 having a plurality of ridges (not shown) disposed on the annular exterior of the piston housing 58. The riddles are used to secure an annular teflon sleeve 62 which is disposed between the ridges of the piston housing 58 and the pressure cylinder 48. The teflon sleeve 62 permits movement of the piston 52 with respect to the pressure cylinder 48 without generating undue frictional forces.

Upward movement of the piston 52 is limited by an annular spacer 64 which is disposed between the piston 52 and a radially extending step portion 68 of the piston post 54. Downward movement of the piston 52 is limited by a threaded nut 66 or similar type fastening element which is threadably received upon the lower portion 70 of the piston post 54. A helical coil spring 72 is arranged concentrically of the nut 66 and is supported at the lower end thereof by a radial outwardly extending flange 74 on the lower end of the nut 66. The upper end of the spring 72 bears against a spring retainer 76 which in turn acts against the underside of a valve disk 78 to thereby resiliently urge the valve disk 78 into sealing engagement with the piston housing 58. A further explanation of the construction and operation of the piston is disclosed in U.S. Pat. No. 4,890,858, which is hereby incorporated by reference. However, other suitable pistons may be used.

A base valve, generally designated by the numeral 80, is located within the lower end of the pressure cylinder 48 and is used to control the flow of damping fluid between the working chamber 50 and an annular fluid reservoir 82. The annular fluid reservoir 82 is defined as the space between the outer periphery of the pressure cylinder 48 and the inner periphery of the housing 46. The operation of the base valve 80 may be similar to the type shown and described in U.S. Pat. No. 3,757,910, which is hereby incorporated by reference. However, other types of base valves may be used.

The upper end portion 86 of the piston rod 56 further includes a connector 88. The connector 88 is used to provide electrical communication between the flex cable 90 which is connected to the actuator described below and the cables 92 leading to the electronic control module 34 associated with the damper 10. The construction and operation of the connector 88 may be that of a pass-through connector which is available from Pave Technology when the damper is loop moduled. However, other suitable connectors may be used. For example, connector 88 may be a type shown and described in U.S. Pat. No. 5,090,524 which is hereby incorporated by reference and which is the preferred connector for stem mounted dampers. The upper end portion 86 of the piston rod 56 further includes a suitable end fitting 93 which is used to secure the upper end portion 86 of the piston rod 56 to the body 30 of the automobile vehicle 12. In addition, the damper 10 also comprises generally cup-shaped upper and lower end caps 94 and 96 respectively. The upper and lower end caps 94 and 96 are secured to opposing ends of the housing 46 by a suitable means such as welding.

To provide means for regulating the flow of damping fluid between the upper and lower portions of the working chamber 50, a rotary valve 98 is provided. The rotary valve 98 permits a greater amount of fluid to flow between the upper and lower end portions of the working chamber 50 than is permitted by the piston 52 itself by bypassing the flow restrictions associated with the piston 52. Accordingly, when a firm compression and rebound stroke is desired, the rotary valve 98 may be closed so that the flow of damping fluid is only regulated by the piston 52. When a medium or soft compression and rebound stroke is desired, the rotary valve 98 is opened to varying degrees so that the amount of damping fluid flowing between the upper and lower portions of the working chamber 50 may be increased. The amount of damping fluid flowing through the rotary valve 98 is adjusted by an actuator described below which in turn is electrically controlled by one of the electronic control modules 34. Accordingly, the driver of the automotive vehicle 12 may choose the desired amount of damping characteristics the damper 10 is able to provide by adjusting the switch module 32 which generates a plurality of electronic control signals. The electronic control modules 34 in turn controls the damping fluid flowing through the rotary valve 98 in response to the electronic control signals from the switch module 32. The operation of the rotary valve 98 is more thoroughly described below.

The rotary valve 98 comprises an annular orifice sleeve 100 which is coaxially disposed within the piston rod 56. The lower end portion of the orifice sleeve 100 has a reduced diameter section 102 which mates with an increased internal diameter section 104 of the piston rod 56 so as to form a cavity 106 therebetween. Fluid from the upper portion 107 of the working chamber 50 is able to flow into the cavity 106 by means of a plurality of radially extending flow passages 174 in the increased diameter section 104 of the piston rod 56. To support the orifice sleeve 100 in an upward direction, a disk-shaped spring 124 is provided. The spring 124 is disposed between the lower portion of the orifice sleeve 100 and the upper portion of the piston post 54 so as to bias the orifice sleeve 100 in an upward direction. The orifice sleeve 100 also has a step 126 which engages the sensor housing of the actuator described below so as to limit upward movement of the orifice sleeve 100. Damping fluid is prevented from flowing between the orifice sleeve 100 and the piston post 54 by an annular retaining seal 128. The annular retaining seal 128 is disposed within an annular groove 130 in an axially extended portion 132 of the piston post 54.

The orifice sleeve 100 has a plurality of flow passages 108-122. The centers of the flow passages 108-114 are disposed on a plane which is perpendicular to the axis of the orifice sleeve 100. Further, the flow passables 108-122 are axially displaced from the flow passages 108-114 and are disposed on a plane which is perpendicular to the axis of the orifice sleeve 100. The flow passages 112 and 114 are substantially identical and are spaced approximately 180° apart. The flow passages 108 and 110 are angularly displaced by approximately 60° from the passages 112 and 114 respectively. The flow passages 108 and 110 are axially displaced along the orifice sleeve 100 from the flow passages 116 and 118, while the flow passages 112 and 114 are axially displaced from the flow passages 120 and 122. Further, the flow passages 116 and 118 have approximately the same diameter as the flow passages 108 and 110, while the flow passages 120 and 122 have approximately the same diameter as the flow passages 112 and 114. Because of their relatively large diameter, a soft rebound and compression stroke is generated by the damper 10 when damping fluid is flowing through the flow passages 112, 114, 120 and 122. Similarly, when damping fluid is flowing through the flow passages 108, 110, 116 and 118, a medium compression and rebound stroke is generated. Finally, when damping fluid is not flowing through any of the flow passages 108-122 in the orifice sleeve 100, a firm compression and rebound stroke is generated since the flow of damping fluid is regulated only by the piston 52.

It will be appreciated that the flow through the flow passages 108-122 in the orifice sleeve 100 will terminate upon extreme extension of the damper, thereby causing the damper to generate a firm damping characteristic. This feature is useful for limiting excessive extension of the shock absorber.

To control the flow of damping fluid flowing through the flow passages 108-122 in the orifice sleeve 100, the rotary valve 98 further comprises an annular shutter sleeve 134 with a closed upper end portion 136 and a central bore 138. The shutter sleeve 134 is disposed coaxially within the orifice sleeve 100, with the radially outer surface of the shutter sleeve 134 being adjacent to the radially inner surface of the orifice sleeve 100. The shutter sleeve 134 has a plurality of flow passages 140-146. The flow passages 140 and 142 are disposed symmetrically about a plane passing axially through the center of the shutter sleeve 134, while the flow passages 144 and 146 are disposed symmetrically about a plane passing axially through the center of the shutter sleeve 134. The centers of the flow passages 140 and 142 lie within the plane established by the centers of the flow passages 108-114 in the orifice sleeve 100. Similarly, the center of the flow passages 144 and 146 lies within the plane established by the centers of the flow passages 116-122 in the orifice sleeve 100. The flow passages 140 and 142 are spaced approximately 180° apart, while the flow passages 144 and 146 are also spaced apart by approximately 180°. As will be more thoroughly discussed below, rotation of the shutter sleeve 134 controls the flow of damping fluid through the flow passages 140-146 of the shutter sleeve 134 and the flow passages 108-114 in the orifice sleeve 100.

When the shutter sleeve 134 is rotated such that the flow passages 140-146 in the shutter sleeve 134 are aligned with the flow passages 112, 114, 120 and 122 in the orifice sleeve 100, damping fluid is able to flow between the upper and lower portions of the working chamber 50 through the flow passages 140-146 and the flow passages 112, 114, 120 and 122. Because the flow passages 112, 114, 120 and 122 in the orifice sleeve 100 are relatively large, a soft compression and rebound stroke is generated.

When the shutter sleeve 134 is rotated further so that the flow passages 140-146 in the shutter sleeve 134 become aligned with the flow passages 108, 110, 116, and 118 in the orifice sleeve 100, a medium compression and rebound stroke is generated as the flow passages 108, 110, 116 and 118 are relatively small. When the shutter sleeve is rotated further such that the flow passages 140-146 in the shutter sleeve 134 are not aligned with any of the flow passages 108-122 in the orifice sleeve 100, damping fluid is unable to flow through the rotary valve 98. Accordingly, the flow of damping fluid between the upper and lower portions of the working chamber 50 is governed by the piston 52 which provides a firm damping characteristic as discussed above. It will be noted that the flow passages 116-122 in the orifice sleeve 100 and the flow passages 120 and 122 in the shutter sleeve 134 are used in conjunction with a check valve described below.

The shutter sleeve 134 further comprises an axially extending projection 148 disposed on the closed upper end portion 136 of the shutter sleeve 134 having a downwardly extending slot 152. The projection 148 extends in the direction towards the upper portion of the working chamber 50 and is used to engage the shaft 154 of the actuator described below which is used to rotate the shutter sleeve 134. By rotating the shutter sleeve 134, the flow passages 140-146 in the shutter sleeve 134 are able to selectively mate with the flow passages 108-122 in the orifice sleeve 100 so that the flow of damping fluid between the upper and lower portions of the working chamber 50 can be controlled.

To provide means for generating a soft compression stroke relative to the rebound stroke, a check valve 160 is provided. The check valve 160 comprises an annular check valve sleeve 162 which is located coaxially within the central bore 138 of the shutter sleeve 134. The lower portion of the check valve sleeve 162 has a radially extending flange 164 which abuts the upper portion of the piston post 54. The check valve sleeve 162 extends from the piston post 54 in a direction towards the upper portion of the working chamber to a point just below the flow passages 144-146 in the shutter sleeve 134. The check valve sleeve 162 has a plurality of radially extending flow passages 166, the centers of which occupy a plane which is coplanar with the plane established by the centers of the flow passages 116-122 in the orifice sleeve 100. Accordingly, damping fluid is able to flow between the upper and lower portions of the working chamber 50 through the flow passages 166 in the check valve sleeve 162 and the flow passages 116-122 in the orifice sleeve 100 when the flow passages 144-146 in the shutter sleeve 134 are aligned with the flow passages 116-122 in the orifice sleeve 100.

The check valve 160 further comprises a closure member 168 which is located within the central bore 138 of the shutter sleeve 134 and is disposed coaxially with respect to the check valve sleeve 162 at the upper end portion thereof. The closure member 168 has a radially extending flange 170 which is able to mate with the upper end portion of the check valve sleeve 162. When the closure member 168 is mated to the upper end portion of the check valve sleeve 162, damping fluid is unable to flow between the upper and lower portions of the working chamber 50 through the flow passages 116-122 of the orifice sleeve 100 as well as the flow passages 144 and 146 of the shutter sleeve 108. However, when the closure member 168 is displaced from the upper surface of the check valve sleeve 162, damping fluid is able to flow between the upper and lower portions of the working chamber 50 through the check valve 160 by way of the flow passages 116-122 of the orifice sleeve 100, and the flow passages 144 and 146 of the shutter sleeve 134.

To bias the closure member 168 against the upper end portion of the check valve sleeve 162, a spring 172 is provided. The spring 172 is disposed within the central bore 138 of the shutter sleeve 134 between the closed upper end portion 136 of the shutter sleeve 134 and the flange 170 of the closure member 168. When the pressure in the lower portion of the working chamber 50 exceeds the pressure in the upper portion of the working chamber 50 so as to overcome the force exerted on the closure member 168 by the spring 172, the damping fluid in the lower portion of the working chamber 50 causes the closure member 168 to compress the spring 172. As the spring 172 is compressed, damping fluid within the check valve sleeve 162 is able to flow from the check valve sleeve 162 through the flow passages 144 and 146 in the shutter sleeve 134 and the flow passages 116-122 in the orifice sleeve 100 into the cavity 106 when the flow passages 116-122 are aligned with the flow passages 144 and 146. The damping fluid in the cavity 106 is then able to flow to the upper portion of the working chamber 50 through the flow passages 174 in the piston rod 56 so as to produce a relatively soft compression stroke. During rebound, the spring 172 causes the closure member 168 to be displaced towards the upper end portion of the check valve sleeve 162 so as to prevent damping fluid in the upper portion of the working chamber 50 to flow to the lower portion of the working chamber 50 through the flow passages 116-122 in orifice sleeve 100 and the flow passages 144-146 in the shutter sleeve 134. Accordingly, a relatively hard rebound stroke is produced by the check valve 160.

To drive the rotary valve 98, an actuator 176 is provided which is coaxially disposed within the piston rod 56. The actuator 176 is used for rotating the shutter sleeve 134 so that the rotary valve 98 may control the flow of damping fluid between the upper and lower portions of the working chamber 50. The actuator 176 has a motor/gear portion 178 and a sensor portion 180 which are separated by a circular support plate 182 which is secured to the motor/gear portion 178 by a plurality of screws (not shown). The circular support plate 182 abuts a step 186 in the piston rod 56 so as to prevent upward movement of the actuator 176. In addition, the sensor portion 180 comprises a sensor housing 188 which has a step 126 which abuts the orifice sleeve 100 to prevent downward movement of the actuator 176. The sensor housing 188 has an aperture 190 which is used to receive the projection 148 of the shutter sleeve 134 as well as a shaft 154 from the actuator 176. The shaft 154 of the actuator 176 has a rectangular end portion 192 which is able to be received by the slot 152 in the projection 148. Accordingly, rotation of the shaft 154 causes rotation of the projection 148 and hence the shutter sleeve 134. The sensor housing 188 further has a recess 194 at its lower end portion which is able to receive an annular retaining seal 196. The annular retaining seal 196 is disposed within the recess 194 to prevent damping fluid to flow between the sensor housing 188 and the projection 148 of the shutter sleeve 134. Further, an annular retaining seal 197 (see FIG. 5) is located adjacent to the interior surface of the piston rod 56 between the sensor housing 188 and the orifice sleeve 100 so as to prevent damping fluid from flowing therebetween. An annular disk 198 is disposed between the sensor housing 188 and the upper closed end portion 136 of the shutter sleeve 134 so as to limit upward movement of the shutter sleeve 134. While the actuator 176 may be manufactured by Copal Co., Ltd., other suitable actuators may be used.

Figures 12, 13:
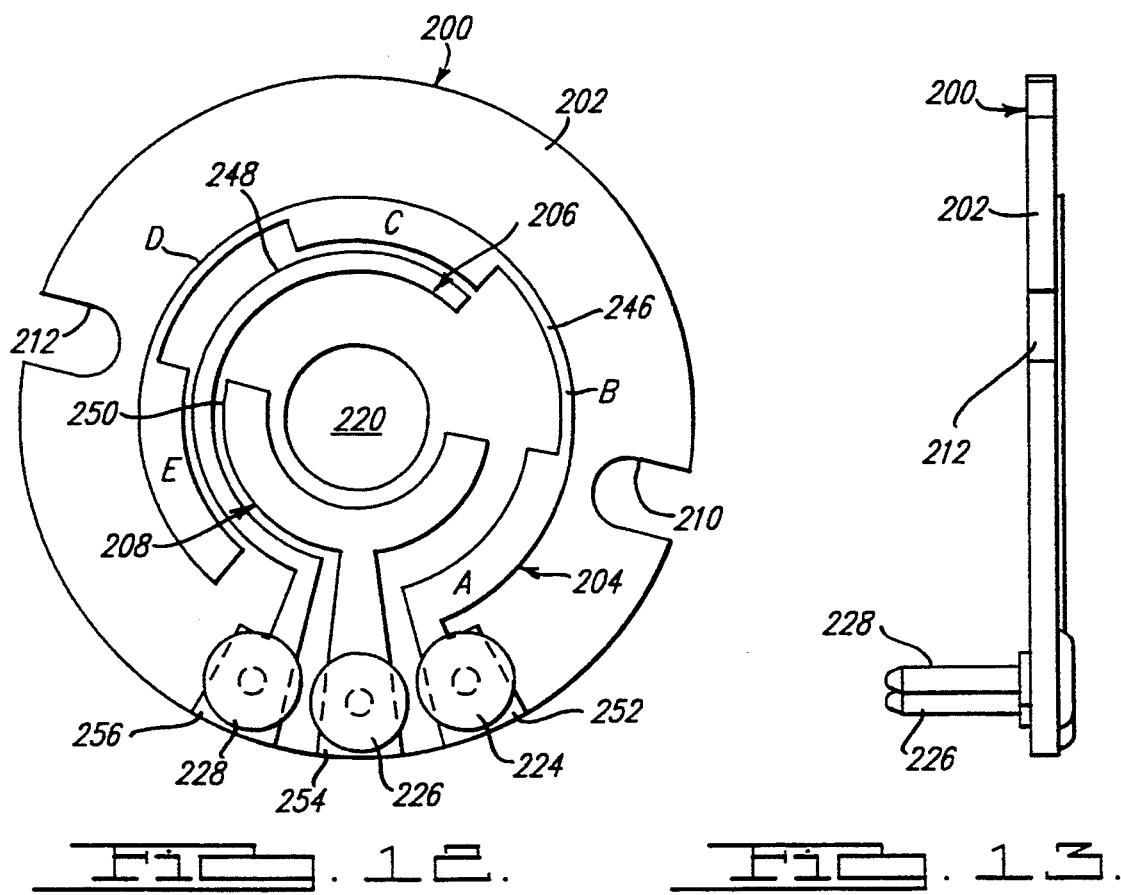
FIGS. 12 and 13 are enlarged views of the encoder disk shown in FIG. 5.

To encode the angular position of the shutter sleeve 134, the actuator 176 further comprises a circular encoder disk 200 as shown in FIGS. 12 and 13. The encoder disk 200 has a planar substrate 202 and a plurality of etched conductors 204-208 disposed thereon. The substrate 202 has two radially inward extending indented regions 210 and 212 on its periphery which are used to receive a plurality of screws (not shown) which secure the encoder disk 200 to a plurality of axially extending projections (not shown) disposed on the circular support plate 182. A circular backing plate 218 is disposed between the support plate 182 and the encoder disk 200 to support the encoder disk 200. The encoder disk 200 further includes a centrally located aperture 220, which is able to receive the shaft 154 of the actuator 176, as well as a plurality of peripherally disposed pins 224-228. The pins 224-228 are located perpendicular to the plane established by the substrate 202 and electrically communicate with a flex cable 90 which is used to electrically connect the encoder disk 200 to the connector 88.

Figures 10, 11:
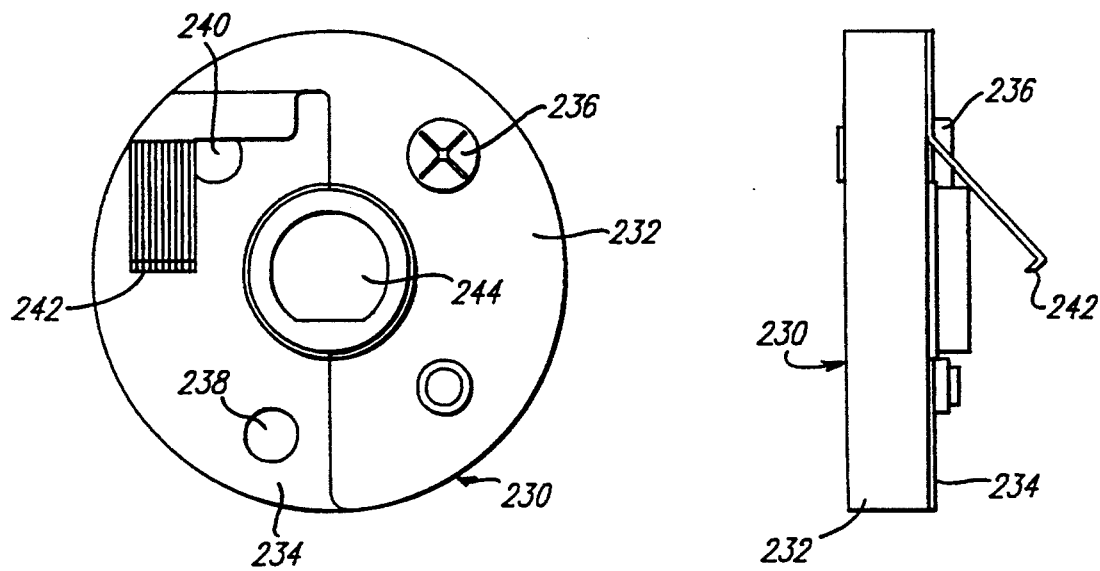
FIGS. 10 and 11 are enlarged views of the brush disk shown in FIG. 5.

The encoder pad 200 is used in conjunction with a brush disk 230 to electrically indicate the position of the shutter sleeve. As shown in FIGS. 10 and 11, the brush disk 230 comprises a disk-shaped substrate 232 with a conductor 234 disposed thereon. The conductor 234 is secured to the substrate 232 of the brush disk 230 by a screw 236 and the locating pins 238 and 240 which are disposed on the substrate 232 and engage holes in the conductor 234. The conductor 234 includes an axially extended brush portion 242 which is able to mate with the conductors 204-208 on the encoder pad 200 in the manner described below. The brush disk 230 further comprises a centrally located aperture 244 which is able to receive the shaft 154 of the actuator 176 so that the brush disk 230 is able to rotate with the shaft 154.

The brush portion 242 and the conductors 204, 206 and 208 are so arranged that when the brush portion 242 contacts the encoder pad 200 in the manner described below, the relative potentials of the conductors 204, 206 and 208 may be used to determine whether the flow passages 140-146 in the shutter sleeve 134 are mated to the flow passages 112, 114, 120 and 122 (producing a soft rebound and compression stroke) or the flow passages 108, 110, 116 and 118 (producing a medium compression and rebound stroke) in the orifice sleeve 100. Further, the encoder pad 200 is able to determine whether there is no alignment between the flow passages 140-146 in the shutter sleeve 134 and the flow passages 108-122 in the orifice sleeve 100 so that a firm rebound and compression stroke is generated.

As shown in FIGS. 12 and 13, the conductors 204, 206 and 208 of the encoder pad 200 have concentric portions 246, 248 and 250 and a radially extending portion 252, 254 and 256. The radially extending portions of 252, 254 and 256 of the conductors 204, 206 and 208 electrically communicate with the pins 224-228 respectively. The concentric portion 250 of the conductor 208 is located closest to the aperture 220, while the concentric portion 248 of the conductor 206 is located adjacent to the perimeter of the concentric portion 250. Finally, the concentric portion 246 of the conductor 204 is disposed further from the aperture 220 than the concentric portion 248 of the conductor 206.

The concentric portion 246 of the conductor 204 comprises regions A-E. The radially inwardmost edge of the regions A, C, and E are radially closer to the aperture 220 than the radially innermost edges of the regions B and D. In addition, the radially outwardmost edge of the regions A-E are substantially the same radial distance from the aperture 220. The concentric portion 250 of the conductor 208 is semicircular in shape such that the concentric portion 250 resides proximate to the regions A and E of the conductor 204. Because the brush portion 242 of the brush disk 230 is only able to contact the conductor 204 as well as the conductor 208 simultaneously at regions A and E, the encoder pad 200 is able to indicate the transitions in damping characteristics in the manner described below.

When the brush portion 242 of the brush disk 230 is located on the region A of the conductor 204, the brush portion 242 permits electrical communication between the conductor 204 and the conductor 208. Because the conductor 204 is grounded, the conductor 208 is drawn to ground potential. The electronic control module 34 interprets the ground potential on the conductor 208 in the manner described below as indicating that the shutter sleeve 134 has rotated to a position which will provide a soft compression and rebound stroke. As the brush portion 242 rotates further in a counterclockwise direction, the brush portion 242 contacts both the conductor 206 as well as region C of the conductor 204. Because the conductor 204 is at ground potential, the voltage appearing on the conductor 206 also goes to ground potential. The ground potential appearing on the conductor 206 and not on the conductor 208 is interpreted by the electronic control module 34 as having the shutter sleeve 134 adjusted to provide a firm compression and rebound stroke.

As the brush portion 242 rotates further in a counterclockwise direction so as to cause electrical communication between the conductor 206, the conductor 208, and region E of the conductor 204, the voltage appearing on both the conductors 206 and 208 goes to ground potential. The electronic control module 34 interprets ground potential appearing on both the conductors 206 and 208 as indicating that the shutter sleeve 134 has rotated to a position which will provide a medium or normal compression and rebound stroke. It will be noted that the electronic control module 34 considers the regions of the encoder pad 200 associated regions B and D of the conductor 204 as non-states and are therefore ignored. However, these regions may be used if a particular application requires the recognition of more than three states.

Figure 14:
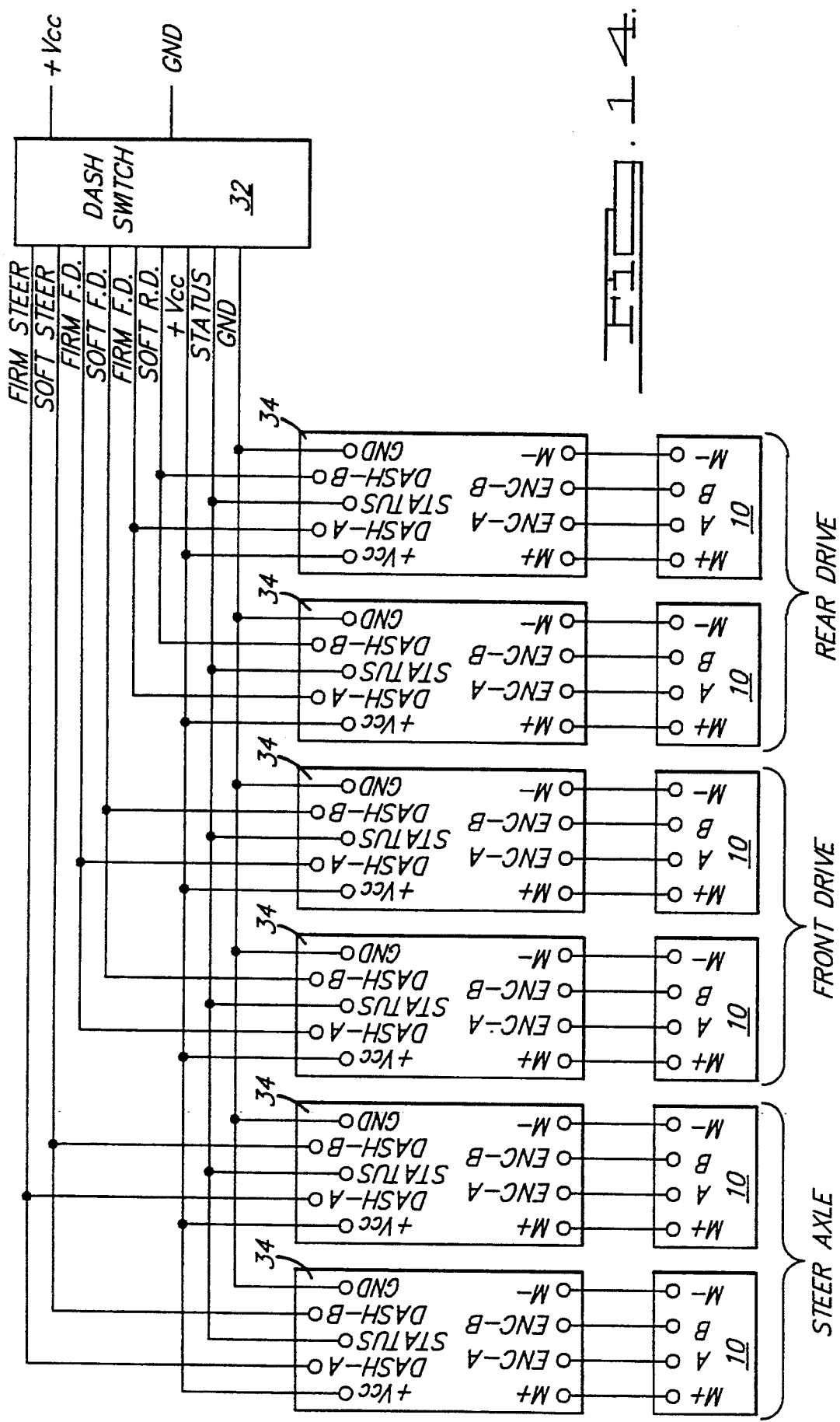
FIG. 14 is an illustration of the electrical connections between the components of the adjustable damping system shown in FIGS. 1–3.

The components of each of the electronic control modules 34 will now be described. As shown in FIG. 14, the switch module 32 is connected both to a positive supply voltage $+V_{cc}$ (nominally 13.8 volts) and to ground, and has three channels for controlling the electronic control modules 34. The first channel includes outputs which are to be used by the electronic control modules 34 associated with the front steer axle assembly (i.e., FIRM STEER, SOFT STEER). The second channel of switch module 32 includes the outputs which are to be used by the electronic control modules 34 associated with the front drive axle assembly (i.e., FIRM F.D. and SOFT F.D.). Finally, the switch module 32 which has a channel which includes outputs to the electronic control modules 34 associated with the rear drive axle assembly of the vehicle (i.e., FIRM R.D. and SOFT R.D.). The outputs associated with each of the channels which are used to generate firm damping characteristics (i.e., FIRM STEER, FIRM F.D. and FIRM R.D.) are connected to the DASH-A terminal of one of the electronic modules 34. Similarly, the outputs associated with each of the channels which are used to generate soft damping characteristics (i.e., SOFT Steer, SOFT F.D., and SOFT R.D.) are connected to the DASH-B terminal of one of the electronic control modules 34. In addition to these channels, the switch module 32 also has conductors which deliver the positive supply voltage $+V_{cc}$ as well as ground to the electronic control modules 34. Finally, the switch module 32 also has a conductor which receives status signals (i.e., STATUS) from each of the electronic control modules 34.

The driver of the automotive vehicle 12 uses the switch module 32 to adjust between the different damping characteristics associated with the dampers 10 of each axle. For example, the switch module 32 which may be a five position switch which is connected such as to provide variety of ride characteristics associated with different combinations of firm and soft damping for each of the axles. It is to be understood, however, that the switch module 32 may have additional channels to incorporate additional dampers associated with other axles, or the additional dampers associated with other axles may simply be wired in parallel with an existing channel. In addition, the various ride characteristics which are associated with different combinations of firm and soft damping may be illustrated on the cover plate of the switch module 34.

Each of the electronic control modules 34 has four connections to the damper 10 to which it corresponds and which are identified as terminals M+, M−, ENC-A and ENC-B. The terminals M+ and M− of the electronic control modules 34 are used to provide voltage for driving the actuator 176 in the damper 10. The ENC-A terminal of the electronic control module 34 is used to provide electrical communication between the electronic control module 34 and the conductor 206 of the encoder pad 200. Similarly, the ENC-B terminal of the control module 34 is used to provide electrical communication between the control module 34 and the conductor 208 of the encoder pad 200.

Figure 15:
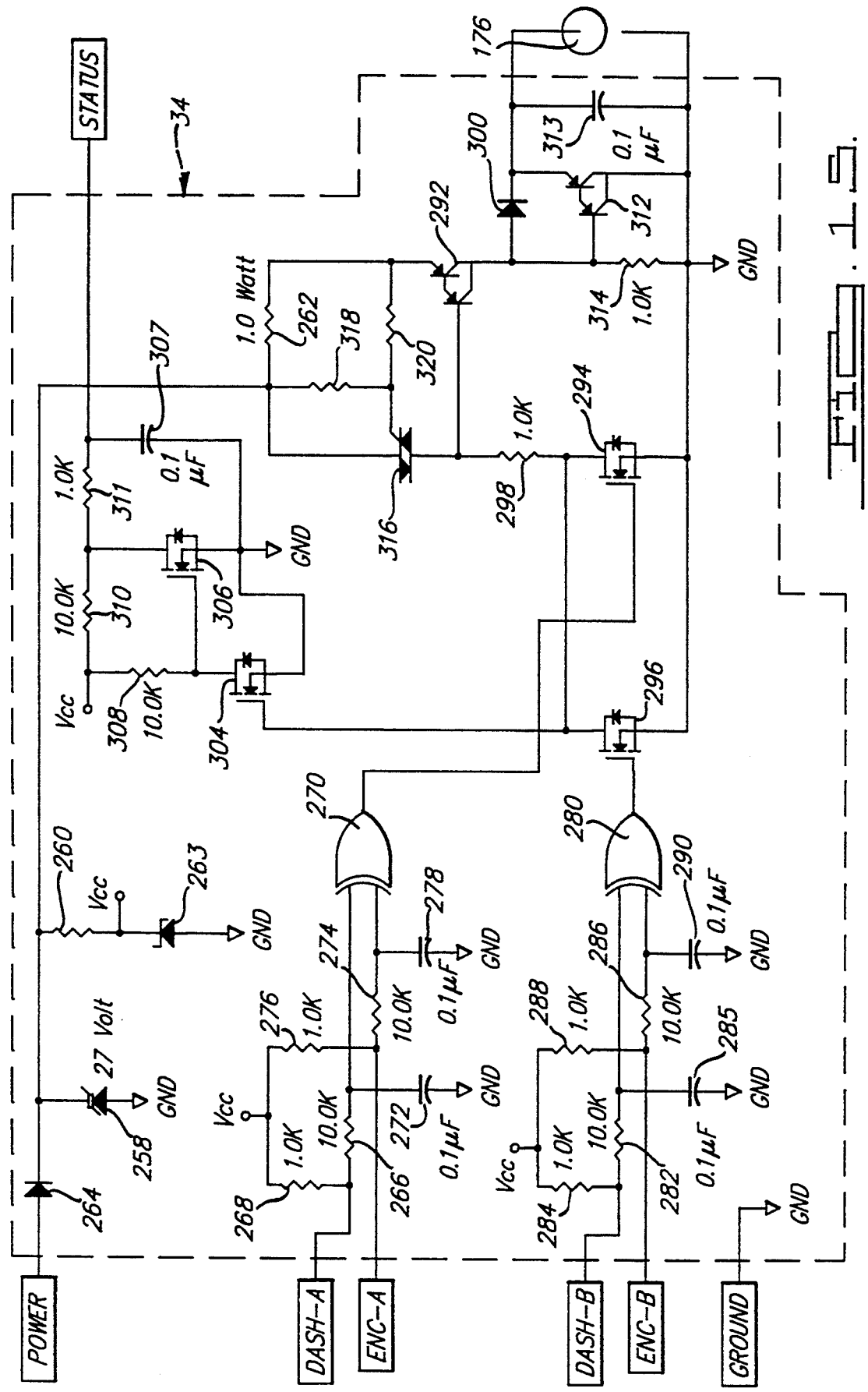
FIG. 15 is schematic diagram of one of the control modules shown in FIGS. 1–3 according to the teachings of the preferred embodiment of the present invention.

The components of the electronic control module 34 will be now more fully described with reference to FIG. 15. To provide a stable source of electrical potential to the electronic control module 34, the electronic control module 34 includes a transient noise-reduction metal-oxide varistor 258, the resistor 260, a zener voltage regulator 263, as well as a diode 264. The diode 264 is connected to the power terminal of the electronic control module 34 and is a reverse voltage protection diode used to protect the electronic control module 34 from power supply polarity reversal. Since the maximum reverse polarity voltage is approximately 200 volts, the diode 264 must be able to withstand at least 200 volts. While the diode 264 may be Motorola Part No. 1N5604, other suitable diodes may be used. The transient noise reduction metal-oxide varistor 258 is connected between the diode 264 and ground. The varistor 258 is used to protect the electronic control module 34 from harmful transient power spikes. The varistor 258 is chosen to have a 27.0 voltage rating so as to allow normal voltage variation to pass while suppressing the transients above the 27 voltage threshold limit (large transients are clipped at the 37.5 volts). While the transient noise reduction metal-oxide varistor 258 may be a Motorola Part No. 1N6281A, other suitable components may be used.

The resistor 260 is a voltage regulation resistor which is selected to assist the diode 263 to regulate voltage. In addition, the resistor 262 is used to provide high-current protection during abnormally high supply voltage and short-circuited motor conditions. The resistor 260 may be a Allen-Bradley Part No. RC07-GF-101K while the resistor 262 may be a Allen-Bradley Part No. RC32-GF-101G-K, though other suitable resistors may be used.

The zener voltage regulator 263 is selected to provide over-voltage protection to the components of the electronic control module 34. This is because the components of the electronic control module 34 may typically be rated from 3 to 18 volts DC, though the highest possible input voltage to the electronic control module 34 is 35 volts (which is the clamping voltage of the transient noise reduction metal-oxide varistor 258). Accordingly, the zener voltage regulator 263 is used to prevent the voltage delivered to the components of the electronic control module 34 from exceeding 15 volts during periods of over-voltage. While the zener voltage regulator 263 may be Part No. 1N4744 manufactured by Motorola, other suitable voltage regulators may be used.

The DASH-A terminal of the electronic control module 34 (i.e., the terminal of the electronic control module 34 which receives firm damping signals from the switch module 32) is connected to the first terminal of the resistor 266 as well as the resistor 268. The resistor 266 is used to provide high-impedance input protection against electrostatic discharge to the exclusive-OR gate 270 described below. In addition, the resistor 268 is a pull-up resistor and is used to provide proper input voltage from the switch module 32. The resistance of the resistor 268 is calculated so as to limit the current through the switch module 32 to 15 milliamperes and therefore has a value of 1.0 K. The resistors 268, 276, 284 and 288 may be Part No. CSC08A-03-103G, while the resistors 266, 274, 282 and 286 may be Part No. CSC06A-01-104G, both supplied by Dale. However, other suitable resistors may also be used.

The second lead of the resistor 266 is connected to the first input of the exclusive-OR gate 270, while the second lead of the resistor 268 is connected $+V_{cc}$. The first input to the exclusive-OR gate 270 is also connected to ground through the capacitor 272. The capacitor 272 is a ESD protection capacitor which is used to provide a path to ground for electrostatic discharges and other high-frequency noise inputs to the circuit. While the capacitor 272 may be Sprague Part No. 1C10X7R103K050B, other suitable capacitors may be used. In addition, while the exclusive-OR gate 270 may be part of a MC14001BAL quad exclusive-OR gate manufactured by Motorola, other suitable exclusive-OR gates may be used.

The second input of the exclusive-OR gate 270 is connected to the ENC-A terminal of the electronic control module 34 which in turn is connected to the conductor 206 of the encoder pad 200 through the resistor 274. The resistor 274 is used to provide high impedance input protection to the exclusive-OR gate 270. The resistor 274 is also connected to $+V_{cc}$ through the resistor 276 which is used as a pull-up resistor to provide proper voltage to the encoder pad 200. The resistor 276 has a value of 1.0K ohm which is calculated to limit the current through the encoder pad 200 to approximately 15 milliamperes. While the resistor 274 may be Part No. CSC06A-01-104G and the resistor 276 may be a part No. CSC08A-03-1036, both supplied by Dale, other suitable components may be used.

The second input of the exclusive-OR gate 270 is connected to ground through the capacitor 278. The capacitor 278 is a ESD protection capacitor which is used to provide a path to ground for electrostatic discharges and other high frequency noise inputs to the circuit. While the capacitor 278 may be a Part No. 1C10X7R103K050B supplied by Sprague, other suitable components may be used.

As will be appreciated by those skilled in the art, the portion of the circuit which includes exclusive-OR gate 270, as well as the resistors 266, 268, 274 and 276, as well as capacitors 272 and 278, is used to generate a logically low output when the switch module 32 and the encoder pad 200 provide substantially the same voltage levels to the electronic control module 34 through the DASH-A and the ENC-A terminals. In this regard, when a logical high value appears at the DASH-A terminal and a logical high value appears at the ENC-A terminal of the electronic control module 34, the inputs to the exclusive-OR gate 270 are both logically high thereby generating a logically low output. If the DASH-A terminal as well as the ENC-A terminal of the electronic control module 34 are grounded, the output from the exclusive-OR gate 270 is also logically low. If either DASH-A terminal is logically high or the ENC-A terminal of the electronic control module 34 is logically high but not both, the inputs to the exclusive-OR gate 270 will be different, thereby producing a logically high output. The output from the exclusive-OR gate 270 is delivered to the gate of a TMOS field-effect transistor described below.

The electronic control module 34 also contains components which are used for determining whether both the DASH-B terminal as well as the ENC-B terminal of the electronic control module 34 receive substantially the same voltage levels. In this regard, the electronic control module 34 includes an exclusive-OR gate 280 which functions in a manner similar to the exclusive-OR gate 270. In this regard, the DASH-B terminal is connected to the first input of the exclusive-OR gate 280 through the resistor 282, as well as to $+V_{cc}$ through the resistor 284. The resistor 282 is an input protection resistor and selected to provide high-impedance input protection to the exclusive-OR gate 280. While the resistor 282 may be part No. CSC06A-01-104G supplied by Dale, other suitable resistors may be used. The resistor 284 is a pull-up resistor which is selected to provide a pull-up voltage to the DASH-B terminal. The value of the resistor 284 is calculated to limit current through the switch to 15 milliamperes and is therefore selected to be 1.0K. While the resistor 284 may be Part No. CSC08A-03-103G supplied by Dale, other suitable resistors may be used.

The first input to the exclusive-OR gate 280 is also connected to ground through the capacitor 285. The capacitor 285 is a ESD protection capacitor and is used to provide a path for electrostatic discharges and other high frequency noise to ground. While the capacitor 285 may be Part No. 1C10X7R103K050B supplied by Sprague, other suitable capacitors may be used.

The second input of the exclusive-OR gate 280 is connected to ENC-B terminal of the electronic control module 34 through the resistor 286, as well as to $+V_{cc}$ through the resistor 288. The resistor 286 is an input protection resistor and is used to provide high-impedance input protection to the exclusive-OR gate 280. While the resistor 286 may be a Part No. CSC06A-01-1046 supplied by Dale, other suitable resistors may be used. The resistor 288 is used to provide a pull-up voltage to the ENC-B terminal of the electronic control module 34. While the resistor 288 may be Part No. CSC08A-03-103G supplied by Dale, other suitable resistor may be used.

The second input to the exclusive-OR gate 280 is connected to the capacitor 290. The capacitor 290 is an electrostatic discharge protection capacitor and is selected to provide a path to ground for electrostatic discharges and other high frequency noise inputs to the exclusive-OR gate 280. While the capacitor 290 may be Sprague Part No. 1C10X7R103K050B, other suitable part numbers may be used.

To provide means for controlling the actuator 176 in response to the signals delivered by the exclusive-OR gates 270 and 280, the driver transistor 292 as well as the gate or TMOS field-effect transistors 294 and 296 are provided. The emitter of the driver transistor 292 is connected to $+V_{cc}$ through the resistors 260 and 262 described above. The base of the driver transistor 292 is connected to the drain of the TMOS field-effect transistors 294 and 296 through the resistor 298. The resistor 298 is used to provide the proper base current for driving the transistor 292. While the resistor 298 may be Part No. RC07-GF-103-K supplied by Allen-Bradley, other suitable resistors may be used. The collector of the driver transistor 292 is connected to the actuator 176 through the diode 300. The diode 300 is used to provide a sufficient bias voltage to the brake transistor described below during operation of the actuator 176 so as to prevent the brake transistor from conducting. While the diode 300 may be Part No. 1N4004 supplied by Motorola, other suitable diodes may be used.

Because the source of the TMOS field-effect transistor 294 as well as the source of the TMOS field-effect transistor 296 are both connected to the ground, it will be noted that whenever the output from either the exclusive-OR gate 270 or the exclusive-OR gate 280 are logically high, the current is delivered to the actuator 176 causing the actuator 176 to rotate. For example, if a logical high voltage is delivered to the gate of the TMOS field-effect transistor 294, the TMOS field-effect transistor 294 begins to conduct causing the voltage at the drain of the TMOS field-effect transistor 294 to decrease. When the decrease in voltage occurs, the base-emitter voltage of the driver transistor 292 will exceed the threshold voltage of the driver transistor 292 so as to cause the driver transistor 292 to be brought into conduction. As this occurs, current is able to be received by the actuator 176 from the collector of the driver transistor 292 through the diode 300 thereby causing the actuator 176 to rotate.

In a similar fashion, when a logically high voltage is delivered to the gate of the TMOS field-effect transistor 296, the voltage at the drain of the TMOS field-effect transistor 296 decreases causing the base-emitter voltage of the driver transistor 292 to increase. When the base-emitter voltage of the driver transistor 292 exceeds its threshold limit, current is delivered through the driver transistor 292 and the diode 300 to the actuator 176. It will be noted that when the drains of the TMOS field-effect transistors 294 and 296 return to a logically high value, the driver transistor 292 will bring itself out of conduction. The driver transistor 292 may be a PNP power Darlington driver transistor which is supplied by Motorola as Part No. MJD117-1, while the TMOS field-effect transistors 294 and 296 may be supplied by Motorola as Part No. 2N7000. However, other suitable transistors may be used.

To provide means for generating a status signal (i.e., STATUS) from the electronic control module 34, the transistors 304 and 306 are provided. The gate of the transistor 304 is connected to the drains of the TMOS field-effect transistors 294 and 296. In addition, the drain of the transistor 304 is connected to the gate of the transistor 306. The source of the transistor 304, as well as the source of the transistor 306, is connected to ground. Further, the drain of the transistor 304 is also connected to $+V_{cc}$ through the resistor 308. The resistor 308 is a "wired-NOR" pull-up resistor and is used to provide a pull-up voltage to the drain of the transistor 304 as well as the gate of the transistor 306.

The drain of the transistor 306 is also connected to $+V_{cc}$ though the resistor 310. The resistor 310 is a "wired-NOR" pull-up resistor which is used to limit the output current at the drain of the transistor 306 to 5.0 milliamperes. The resistors 308 and 310 may be Part No. RC07-GF-104-K, supplied by Allen-Bradley. However, other suitable resistors may be used. Finally, the drain of the transistor 306 is connected to the source of the transistor 306 through the capacitor 307 which is used to protect the transistor 306 from static electricity.

The transistors 304 and 306 serve to identify when the electronic control module 34 generates a signal to drive the actuator 176 in the following manner. When the inputs to either the exclusive-OR gate 270 or the exclusive-OR gate 280 have logically different voltages indicating that the actuator 176 is to rotate, the output from either the exclusive-OR gate 270 or the exclusive-OR gate 280 goes logically high. This causes the voltage at the drain of the TMOS field-effect transistor 294 as well as the drain of the TMOS field-effect transistor 296 to go logically low thereby causing a logical low voltage to be delivered to the gate of the transistor 304. The transistor 304 is therefor brought out of conduction thereby causing a logically high voltage to appear at the drain of the transistor 304. Because the drain of the transistor 304 is connected to the gate of the transistor 306, the logically high value appearing on the drain of the transistor 304 causes the transistor 306 to conduct thereby resulting in a decrease in the voltage appearing at the drain of the transistor 306. The signal which appears at the drain of the transistor 306, which is identified as STATUS, is delivered from the STATUS terminal of the electronic control module 34 through the resistor 311 and is used by the switch module 32 to visually indicate when electronic control unit 34 is directing the actuator 176 to rotate. The operation of the switch module 32 will be more completely described below. Resistor 311 serves as an electrostatic discharge input protection resistor.

When the outputs from either the exclusive-OR gates 270 or 280 both return to a logically high value indicating that no further rotation of the actuator 176 is required, the voltage delivered to the gates of the TMOS field-effect transistor 294 and 296 become both logically low, thereby producing a logically high voltage at the drains of the TMOS field-effect transistors 294 and 296. This logical high voltage brings the transistor 304 into conduction thereby reducing the voltage appearing at the drain of the transistor 304. This reduction in the voltage at the drain of the transistor 304 brings the transistor 306 out of conduction thereby producing a logical high signal (i.e., STATUS) at the drain of the transistor 306. Accordingly, by monitoring the STATUS signal appearing at the drain of the transistor 306, it is possible to determine whether the actuator 176 is being driven appropriately.

To provide means for braking the movement of the actuator 176, a brake transistor 312 is provided. The emitter of the brake transistor 312 is connected to the actuator 176 as well as to the diode 300 described above. In addition, the emitter of the brake transistor 312 is connected to ground through the capacitor 313 which is used to filter out voltage spikes. The collector of the brake transistor 312 is connected to ground, while the base of the transistor is connected to ground through the resistor 314. The resistor 314 is selected to provide a proper base current for the transistor 312. The brake transistor 312 may be Part No. MPS-A77 supplied by Motorola.

When the actuator 176 is being driven, the brake transistor 312 is not conducting because the base-emitter voltage of the brake transistor 312 (approximately 0.6 volts) is less than the threshold voltage of the brake transistor 312 (approximately 1.2 volts). When the current delivered from the drive transistor 292 to the actuator 176 terminates (i.e., further rotation of the actuator 176 is not desired), the voltage which is delivered to the emitter of the brake transistor 312 is generated by continued rotation of the actuator 176 (i.e., by the rotational momentum of the actuator 176). Because the current is unable to flow from the actuator 176 to the base of the brake transistor 312 because of the diode 300, the voltage which is generated by the actuator 176 causes the base-emitter voltage of the brake transistor 312 to increase thereby driving the brake transistor 312 into conduction. This causes the terminals of the actuator 176 to be connected to ground thereby rapidly decreasing the rotational movement of the actuator 176.

To provide short-circuit protection for the driver transistor 292, the triac 316 as well as the resistors 318 and 320 are provided. The first lead to the resistor 318 is connected to POWER terminal of the electronic control module 34 while the second lead of the resistor 318 is connected to the first lead of the resistor 320. The first lead of the resistor 318 is also connected to the second lead of the resistor 320 through the resistor 262. In addition, the second lead of the resistor 320 is connected to the emitter of the driver transistor 292. One anode of the triac 316 is connected to the first lead of the resistor 318, while the second anode of the triac 316 is connected to the base of the driver transistor 292 as well as to the drain of the transistor 294 through the resistor 298. Finally, the gate of the triac 316 is connected to the second lead of the resistor 318 as well as the first lead to the resistor 320.

As those skilled in the art will appreciate, the resistors 318 and 320 form a voltage divider which control the operation of the triac 316 in the following manner. In the absence of a short circuit in the actuator 176, the voltage at the gate of the triac 316 generated by the operation of the resistors 318 and 320 is relatively low so that the triac 316 does not conduct. When the triac 316 is not conducting, the operation of the driver transistor 292 is controlled by comparators 270 and 280 as described above. When a short circuit occurs in the actuator 176, the voltage appearing on the gate of the triac 316 becomes sufficiently large so as to bring the triac 316 into conduction thereby reducing the base-emitter voltage appearing on the driver transistor 292. This reduction in the base-emitter voltage of the driver transistor 292 brings the driver transistor 292 out of conduction thereby preventing possible damage to the driver transistor 292.

Figure 17:
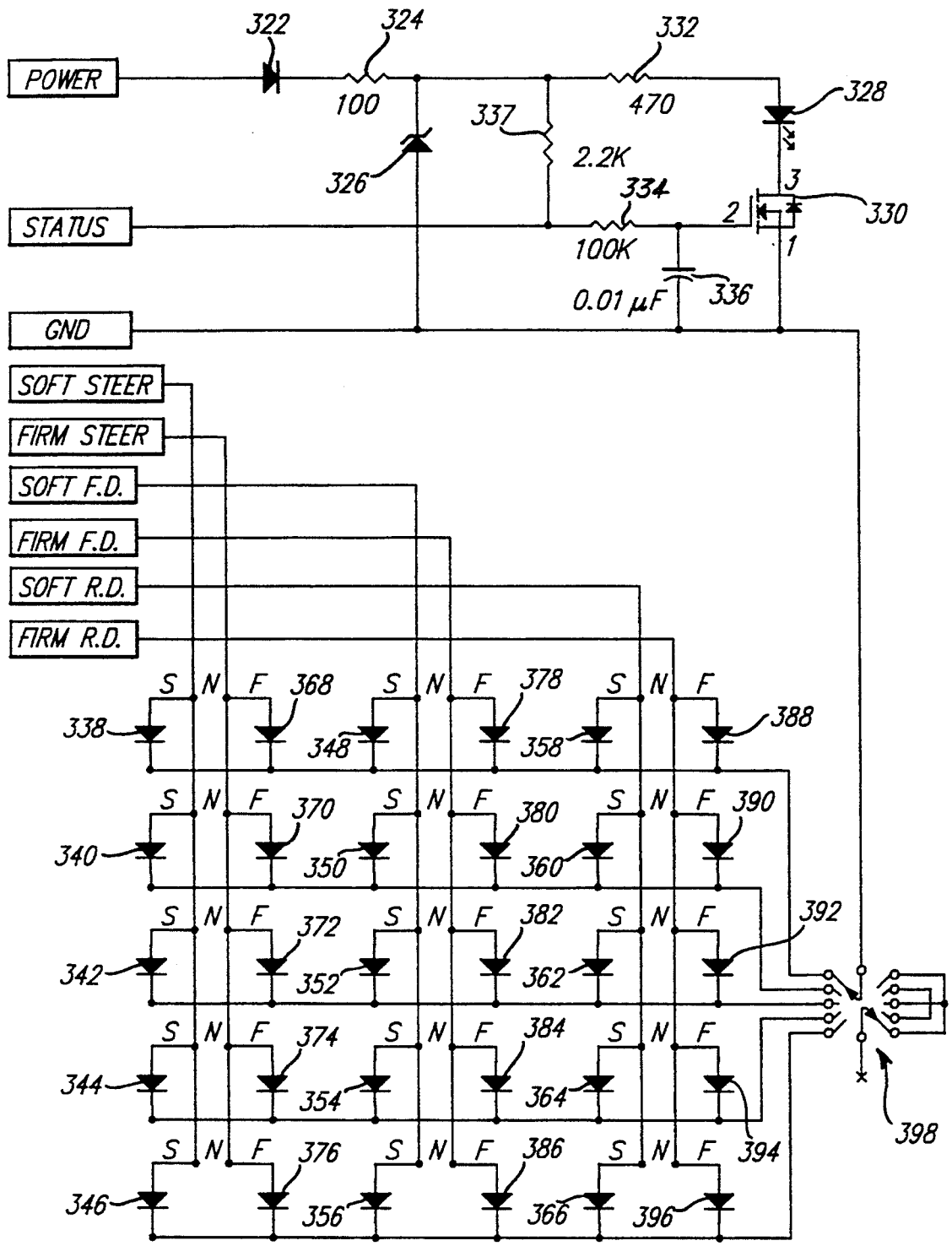
FIG. 17 is a schematic diagram of the switch shown in FIGS. 1–3.

The components of the switch module 32 will now be described with reference to FIG. 17. As discussed above, the switch module 32 receives electricity from the POWER terminal of the switch module 32 which is connected to the ignition system of the automobile. Electricity received from the POWER terminal of the switch module 32 passes through the diode 322 which serves to protect against reverse voltages. The output from the diode 322 is connected to the resistor 324 which in turn is connected to ground through the zener diode 326. The resistor 324 as well as the zener diode 326 serve to form a regulated voltage supply of approximately 12 volts. The output from the resistor 324 is delivered to a LED 328 and then to the drain of a transistor 330 through the resistor 332. The resistor 332 is used for limiting the current through the LED 328. The source of the transistor 330 is connected to the GROUND terminal of the switch module 32, while the gate of the transistor 330 is connected to the STATUS terminal of the switch module 32 through the resistor 334 and to the GROUND terminal of the switch module 32 through the capacitor 336. The resistor 334 and the capacitor 336 are used to provide electrostatic discharge protection. Finally, the STATUS terminal of the switch module 32 is connected to the resistor 324 through the resistor 337 which serves as a pull-up resistor.

The signal which is delivered to the STATUS terminal of the switch module 32 is logically high when one of the electronic control modules 34 is indicated as being used to drive one of the actuators 176. A logical high signal delivered to the STATUS terminal of the switch module 32 in turn causes the transistor 330 to conduct. As those skilled in the art will appreciate, when the transistor 330 is conducting, the voltage across the LED 328 is sufficient to cause illumination of the LED 328.

Figure 18:
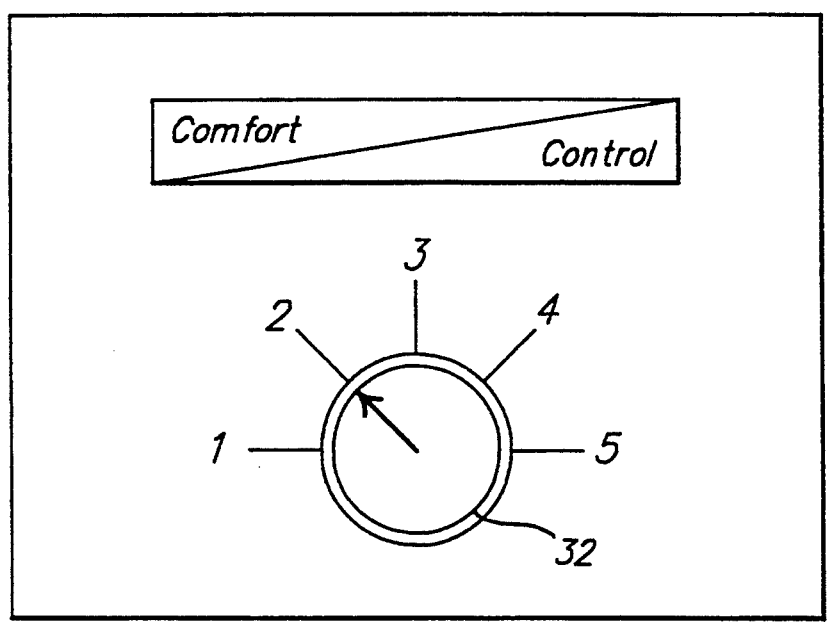

To allow the switch module 32 to be programmed to provide a variety of damping characteristics, the switch module 32 includes a first plurality of diodes 338–366 and a second plurality of diodes 368–396. The first plurality of diodes 338–366 and the second plurality of diodes 368–396 are used to selectively ground the various terminals of the switch module 32 which control the actuators 176. Because the various terminals of the switch module 32 which control the actuators 176 may be selectively generated, the switch module 32 may be programmed to provide different settings for each of the dampers 10 by selectively removing some of the diodes 338–396. This may be explained using the following example. If the position of the knob 398 of the switch module 32 is placed at the setting shown in FIG. 17 and it is desired to program the switch such that the dampers 10 associated with the steer axle assembly are to provide soft damping characteristics, then the diode 338 is removed. Similarly, if it is desired to program the dampers 10 associated with the steer axle assembly so as to provide firm damping characteristics in the position of the knob 368 shown in FIG. 18, then the diode 368 is removed. If it is desired to have normal damping of the dampers 10 of the steer axle assembly when the position of the knob 398 is as shown in FIG. 17, then both the diodes 338 and 368 are not removed. It will be appreciated by those skilled in the art that the other dampers 10 may be programmed in the same manner. In addition it will be noted that, during mass production, the circuit shown in FIG. 17 will be altered to avoid any potential accommodation for many of the diodes 338–396 which would otherwise be removed as described above depending on the desired damping characteristics.

The method of operation of the present invention will now be described. When the driver of the automotive vehicle 12 decides to change the damping characteristics, the driver actuates the switch module 32 which causes a plurality of electrical control signals to be delivered to each of the electronic control modules 34. Each of the electronic control modules 34 in turn receive signals from the encoder pads 200 of the damper 10 to which it is connected. The corresponding signals from both the switch module 32 and the encoder pad 200 are then compared by the electronic control module 34 to determine whether any substantial differences exist. If the corresponding electrical control signals from the switch module 32 are different from the signals received from the encoder pad 200, either the exclusive-OR gate 270 or the exclusive-OR gate 280 drive either of the TMOS field-effect transistors 294 or 296 into conduction. This causes the base-emitter voltage of the driver transistor 292 to increase, thereby bringing the driver transistor 292 into conduction. The actuator 176 is therefore able to receive sufficient voltage through the driver transistor 292 to cause rotation.

When the actuator 176 has rotated a sufficient amount so that the corresponding signals received from both the switch module 32 as well as the encoder pad 200 are logically equivalent, the output from the exclusive-OR gates 270 and 280 declines thereby bringing the TMOS field-effect transistors 294 and 296 out of conduction. This causes the base-emitter voltage of the driver transistor 292 to decline, thereby bringing the driver transistor 292 out of conduction so that no voltage is supplied by the driver transistor 292 to the actuator 176. Because the actuator 176 is nevertheless still rotating due to rotation momentum, the base-emitter voltage of the brake transistor 312 increases thereby driving the brake transistor 312 into conduction. This causes the terminals of the actuator 176 to be connected to ground, thereby draining the residual electromotive force from the actuator 176 and causing the rotation of the actuator 176 to terminate.

It will therefore be seen that the present invention is capable of fulfilling the objects of the invention stated above. The control module is able to relatively quickly rotate the actuator so that the damper can provide the appropriate damping forces. In addition, the electronic control module may be used with a wide variety of different dampers and therefore different motor vehicles. Because the components of the present invention do not involve exceedingly complex electronics, they are suitable for installation in a vehicle in the aftermarket and can also be easily modified for different vehicle installations. Finally, those skilled in the art will readily appreciate that a suspension system using the present invention may be expanded to additional axles after initial installation by simply placing an additional control module in parallel with an existing control module and then installing an additional damper to correspond with the new control module. The scope of the invention is therefore to be measured against the scope of the following claims.

What is claimed is:

1. An expandable and adjustable damping system for a motor vehicle comprising:
   a plurality of dampers each having
   (a) a pressure cylinder forming a working chamber having first and second portions operable to store damping fluid,
   (b) means for electrically controlling the flow of damping fluid between said first and second portions of said pressure cylinder, and
   (c) a control module operable to control the damping characteristics of said damper, said control module being disposed proximate to said pressure cylinder;
   means for generating a plurality of electrical control signals for controlling the operation of each of said control modules, said generating means being manually selectable between at least three pre-defined damping characteristics associated with said plurality of dampers; and
   means for connecting each of said control modules to said generating means, wherein at least one of said control modules comprises
   (a) a driver transistor electrically coupled to one of said dampers, said driver transistor being operable to selectively deliver current to said one damper to thereby cause the damping characteristics of said one damper to change, (b) a first gate transistor for controlling the current delivered to the base of said driver transistor in response to whether a first input from said one damper is substantially different from a first input from said means for generating a plurality of electrical control signals, and (c) a second gate transistor for controlling the current delivered to the base of said driver transistor in response to whether a second input from said one damper is substantially different than a second input from said means for generating a plurality of electrical control signals.

2. The adjustable damping system of claim 1, wherein said one control module further comprises means for generating a diagnostic signal.

3. The adjustable damping system of claim 2, wherein said means for generating a diagnostic signal comprises:
(a) a first fault detection transistor electrically coupled to said first gate transistor; and
(b) a second fault detection transistor electrically coupled to said first fault detection transistor, said second fault detection transistor being operable to generate said diagnostic signal.

4. The adjustable damping system of claim 2, wherein said one damper further comprises an electrical actuator for electrically changing the damping characteristics of said one damper, said one control module further comprises means for selectively grounding said actuator when said first input from said one damper is substantially equal to said first input from said means for generating a plurality of electrical control signals.

5. The adjustable damper of claim 4, wherein said means for selectively grounding said actuator comprises a brake transistor electrically coupled to said actuator and said drive transistor.

6. The adjustable damping system of claim 1, wherein each of said control modules are operable to control the damping characteristics of only one of said dampers.

7. The adjustable damping system of claim 1, wherein said means for generating an electrical control signal comprises a manually operable switch.

8. The adjustable damping system of claim 7, wherein said switch is operable to change the damping characteristics of each of said dampers.

9. The adjustable damping system of claim 7, wherein said manually operated switch is operable to cause at least two of said dampers to provide different damping characteristics.

10. The adjustable damping system of claim 1, wherein each of said dampers comprises:
(a) first valve means for establishing a first plurality of flow passages, said first valve means being disposed within said pressure cylinder;
(b) a second valve means for establishing a second plurality of flow passages, said second valve means being disposed within said pressure cylinder and being displaceable with respect to said first valve means, the displacement of said second valve means with respect to said first valve means operable to vary the flow of damping fluid between said first and second portions of said working chamber;
(c) actuator means for displacing said second valve means with respect to said first valve means.

11. The adjustable damping system of claim 10, wherein each of said actuator means comprises means for encoding the displacement of said second valve means with respect to said first valve means.

12. The adjustable damping system of claim 11, wherein said means for encoding is operable to permit said control means to determine whether said second valve means has been displaced with respect to said first valve means to one of at least three positions.

13. The adjustable damping system of claim 12, wherein said means for encoding comprises a substrate with three encoder conductors disposed thereon, each of said conductors having a circular portion and radially extending portion, said circular portion of at least one of said encoder conductors having a first and second plurality of regions, said first plurality of regions being disposed closer to the center of said circular region than said second region.

14. The adjustable damping system of claim 13, wherein said actuator means further comprises means for causing selective electrical communication between said encoder conductors of said means for encoding.

15. The adjustable damping system of claim 14, wherein said means for causing selective electrical communication between said conductors comprises a brush disk, said brush disk comprising a circular substrate with conductor disposed thereon, said conductor of said brush disk having a brush portion which is disposed adjacent to said encoder conductors.

16. The adjustable damping system of claim 15, wherein the width of said brush portion is sufficiently large to cause electrical communication between a first of said encoder conductors and said first plurality of regions of a second said encoder conductors while being sufficiently narrow to avoid electrical communication between said first of said encoder conductors and said second regions of said second of said encoder conductor.

17. An expandable and adjustable damping system in which a driver of an automotive vehicle having a plurality of wheels is able to manually adjust the suspension system to provide at least three ride characteristics, said adjustable damping system comprising:
means for permitting said driver to select one of said at least three ride characteristics and generating a plurality of electrical control signals in response to said selection, said means for permitting said driver to select one of said at least three ride characteristics having a plurality of channels for propagating said electrical control signals;
a plurality of distributed dampers each being operatively associated with one of said wheels of said automotive vehicle; and
a plurality of control modules equal in number to said plurality of distributed dampers, each control module being operable to control a respective damper and electrically communicating with said respective damper and one of said channels, wherein at least one of said control modules comprises
(a) a driver transistor electrically coupled to one of said dampers, said driver transistor coupled to one operable to selectively deliver current to said one damper to thereby cause the damping characteristics of said one damper to change,
(b) a first gate transistor for controlling the current delivered to the base of said driver transistor in response to whether a first input from said one damper is substantially different from a first input from said means for generating a plurality of electrical control signals, and (c) a second gate transistor for controlling the current delivered to the base of said driver transistor in response to whether a second input from said one damper is substantially different than a second input from said means for generating a plurality of electrical control signals.

18. The adjustable damping system of claim 17, wherein said one control module further comprises means for generating a diagnostic signal.

19. The adjustable damping system of claim 18, wherein said means for generating a diagnostic signal comprises:
(a) a first fault detection transistor electrically coupled to said first gate transistor; and
(b) a second fault detection transistor electrically coupled to said first fault detection transistor, said second fault detection transistor being operable to generate said diagnostic signal.

20. The adjustable damping system of claim 19, wherein said one damper further comprises an electrical actuator for electrically changing the damping characteristics of said one damper, said one control module further comprises means for selectively grounding said actuator when said first input from said one damper is substantially equal to said first input from said means for generating a plurality of electrical control signals.

21. The adjustable damper of claim 20, wherein said means for selectively grounding said actuator comprises a brake transistor electrically coupled to said actuator and said drive transistor.

22. The adjustable damping system of claim 17, wherein each of said control modules are operable to control the damping characteristics of only one of said dampers.

23. The adjustable damping system of claim 17, wherein said means for generating an electrical control signal comprises a manually operable switch.

24. The adjustable damping system of claim 23, wherein said switch is operable to change the damping characteristics of each of said dampers.

25. The adjustable damping system of claim 23, wherein said manually operated switch is operable to cause at least two of said dampers to provide different damping characteristics.

26. The adjustable damping system of claim 17, wherein each of said dampers comprises:
(a) first valve means for establishing a first plurality of flow passages, said first valve means being disposed within said pressure cylinder;
(b) a second valve means for establishing a second plurality of flow passages, said second valve means being disposed within said pressure cylinder and being displaceable with respect to said first valve means, the displacement of said second valve means with respect to said first valve means operable to vary the flow of damping fluid between said first and second portions of said working chamber;
(c) actuator means for displacing said second valve means with respect to said first valve means.

27. The adjustable damping system of claim 26, wherein each of said actuator means comprises means for encoding the displacement of said second valve means with respect to said first valve means.

28. The adjustable damping system of claim 27, wherein said means for encoding is operable to permit said control means to determine whether said second valve means has been displaced with respect to said first valve means to one of at least four positions.

29. The adjustable damping system of claim 28, wherein said means for encoding comprises a substrate with three encoder conductors disposed thereon, each of said conductors having a circular portion and radially extending portion, said circular portion of at least one of said encoder conductors having a first and second plurality of regions, said first plurality of regions being disposed closer to the center of said circular region than said second region.

30. The adjustable damping system of claim 29, wherein said actuator means further comprises means for causing selective electrical communication between said encoder conductors of said means for encoding.

31. The adjustable damping system of claim 30, wherein said means for causing selective electrical communication between said conductors comprises a brush disk, said brush disk comprising a circular substrate with conductor disposed thereon, said conductor of said brush disk having a brush portion which is disposed adjacent to said encoder conductors.

32. The adjustable damping system of claim 31, wherein the width of said brush portion is sufficiently large to cause electrical communication between a first of said encoder conductors and said first plurality of regions of a second said encoder conductors while being sufficiently narrow to avoid electrical communication between said first of said encoder conductors and said second regions of said second of said encoder conductors.

* * * * *

UNITED STATES PATENT AND TRADEMARK OFFICE
CERTIFICATE OF CORRECTION

PATENT NO. : 5,350,187
DATED : September 27, 1994
INVENTOR(S) : David M. Shinozaki It is certified that error appears in the above-indentified patent and that said Letters Patent is hereby corrected as shown below:

Col. 1, line 43, first occurrence of "the" should be --this--;

Col. 3, line 6, "steel" should be --steer--;

Col. 3, line 65, "riddles" should be --ridges--;

Col. 3, line 65, "teflon" should be --Teflon®--;

Col. 3, line 68, "teflon" should be --Teflon®--;

Col. 5, line 40, "passables" should be --passages--;

Col. 5, line 41, "108" should be --116--;

Col. 5, line 47, after first occurrence of "the" insert --flow--;

Col. 11, lines 51-52, "RC32-GF-101G-K" should be --RC32-GF-10G-K--;

Col. 14, line 2, insert --driver-- before "transistor";

Col. 15, line 36, "transistor" should be --transistors--;

Col. 20, line 59, claim 17, insert --being-- after "transistor"; and

Col. 20, lines 59-60, claim 17, delete "coupled to one".

Signed and Sealed this

Thirtieth Day of May, 1995

Attest:

BRUCE LEHMAN

Attesting Officer    Commissioner of Patents and Trademarks